US011831049B2

United States Patent
Shim et al.

(10) Patent No.: US 11,831,049 B2
(45) Date of Patent: Nov. 28, 2023

(54) FUEL CELL POWER PACK

(71) Applicant: DOOSAN MOBILITY INNOVATION INC., Yongin (KR)

(72) Inventors: Gyu Jung Shim, Anyang (KR); Myeong Hun Seung, Incheon (KR); Jae Hwan Lee, Yongin (KR)

(73) Assignee: DOOSAN MOBILITY INNOVATION INC., Yongin (KR)

( * ) Notice: Subject to any disclaimer, the term of this patent is extended or adjusted under 35 U.S.C. 154(b) by 351 days.

(21) Appl. No.: 17/270,444

(22) PCT Filed: Aug. 26, 2019

(86) PCT No.: PCT/KR2019/010863
§ 371 (c)(1),
(2) Date: Feb. 23, 2021

(87) PCT Pub. No.: WO2020/045930
PCT Pub. Date: Mar. 5, 2020

(65) Prior Publication Data
US 2021/0249670 A1 Aug. 12, 2021

(30) Foreign Application Priority Data

Aug. 31, 2018 (KR) .................. 10-2018-0103813

(51) Int. Cl.
*H01M 8/04082* (2016.01)
*H01M 8/04119* (2016.01)
(Continued)

(52) U.S. Cl.
CPC ... *H01M 8/04201* (2013.01); *H01M 8/04126* (2013.01); *H01M 8/04156* (2013.01);
(Continued)

(58) Field of Classification Search
CPC ........ H01M 8/04201; H01M 8/04126; H01M 8/04156; H01M 8/2475; H01M 8/249; H01M 2220/20
See application file for complete search history.

(56) References Cited

U.S. PATENT DOCUMENTS

2006/0141321 A1* 6/2006 Pristash ................ H01M 8/241
429/514
2006/0234094 A1* 10/2006 Sakai ..................... B60L 58/33
429/432
(Continued)

FOREIGN PATENT DOCUMENTS

CN 2696975 Y 5/2005
CN 101120472 A * 2/2008 .............. H01M 8/04
(Continued)

OTHER PUBLICATIONS

Machine Translation of CN-101120472-A (Apr. 12, 2023) (Year: 2023).*
(Continued)

*Primary Examiner* — Matthew J Merkling
(74) *Attorney, Agent, or Firm* — Harvest IP Law, LLP

(57) ABSTRACT

A fuel cell power pack is provided. The fuel cell power pack may include a case, a gas tank placed in a gas tank mounting and removing part formed in the case, and a fuel cell unit placed in the case in a weight balance with the gas tank. According to the fuel cell power pack, it is possible to reduce weight by supplying power from a fuel cell while enabling long-term operation of a flying object such as a drone, to maintain an overall weight balance and achieve a stable operation of the drone, even if integrally mounted in the drone, to maintain a stable operating environment temperature of a stack by improving an air circulation structure, and
(Continued)

to enhance the user's convenience with a gas supply structure that is easy to attach and detach the gas tank.

18 Claims, 38 Drawing Sheets

(51) Int. Cl.
*H01M 8/2475* (2016.01)
*H01M 8/249* (2016.01)

(52) U.S. Cl.
CPC ......... *H01M 8/249* (2013.01); *H01M 8/2475* (2013.01); *H01M 2220/20* (2013.01)

(56) References Cited

U.S. PATENT DOCUMENTS

| | | | | |
|---|---|---|---|---|
| 2015/0180058 A1* | 6/2015 | Kim | ................... | H01M 8/04164 |
| | | | | 429/414 |
| 2016/0121964 A1* | 5/2016 | Nagaya | ................... | B60L 1/003 |
| | | | | 180/220 |
| 2017/0240291 A1* | 8/2017 | Kim | ................... | B64C 39/024 |

FOREIGN PATENT DOCUMENTS

| | | |
|---|---|---|
| CN | 207631504 U | 7/2018 |
| JP | 2009191889 A | 8/2009 |
| JP | 3159067 U | 5/2010 |
| JP | 2010255722 A | 11/2010 |
| JP | 2011507165 A | 3/2011 |
| JP | 2018176920 A | 11/2018 |
| KR | 1020140136749 A | 12/2014 |
| KR | 101757442 B1 | 7/2017 |
| KR | 101806261 B1 | 12/2017 |
| KR | 101866191 B1 | 6/2018 |
| WO | 2005034272 A1 | 4/2005 |
| WO | 2018046990 A1 | 3/2018 |

OTHER PUBLICATIONS

Machine Translation of KR101806261 (Apr. 12, 2023) (Year: 2023).*
Search Report dated on Nov. 11, 2022 by the PTO(EP).
JP Office Action dated Sep. 9, 2022.
JP Office Action dated Jun. 1, 2022.
EP Office Action dated Jul. 4, 2022.

* cited by examiner

[FIG. 1]
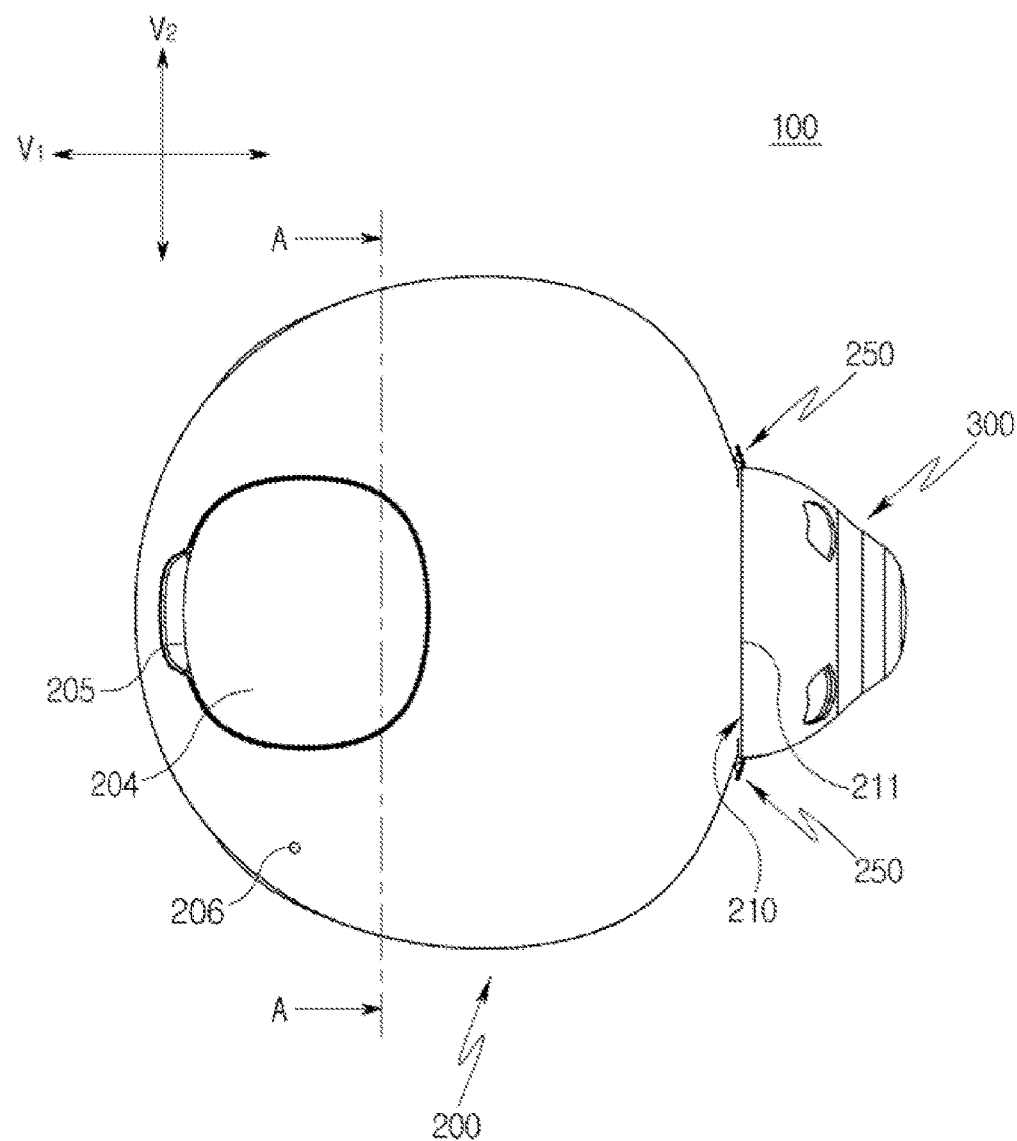

[FIG. 2]
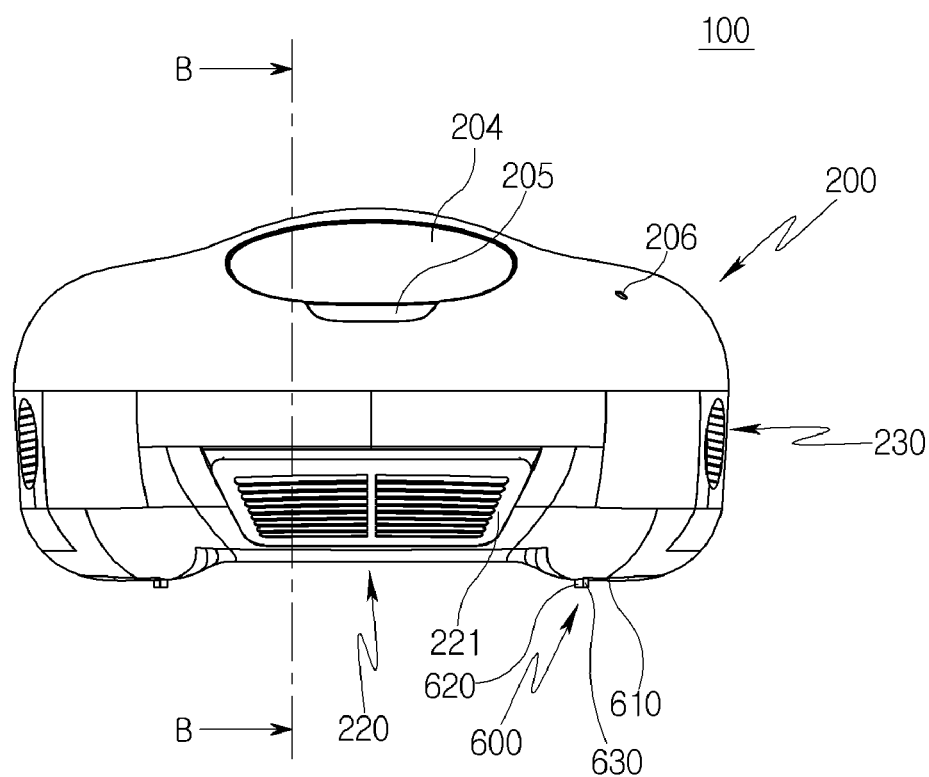

[FIG. 3]
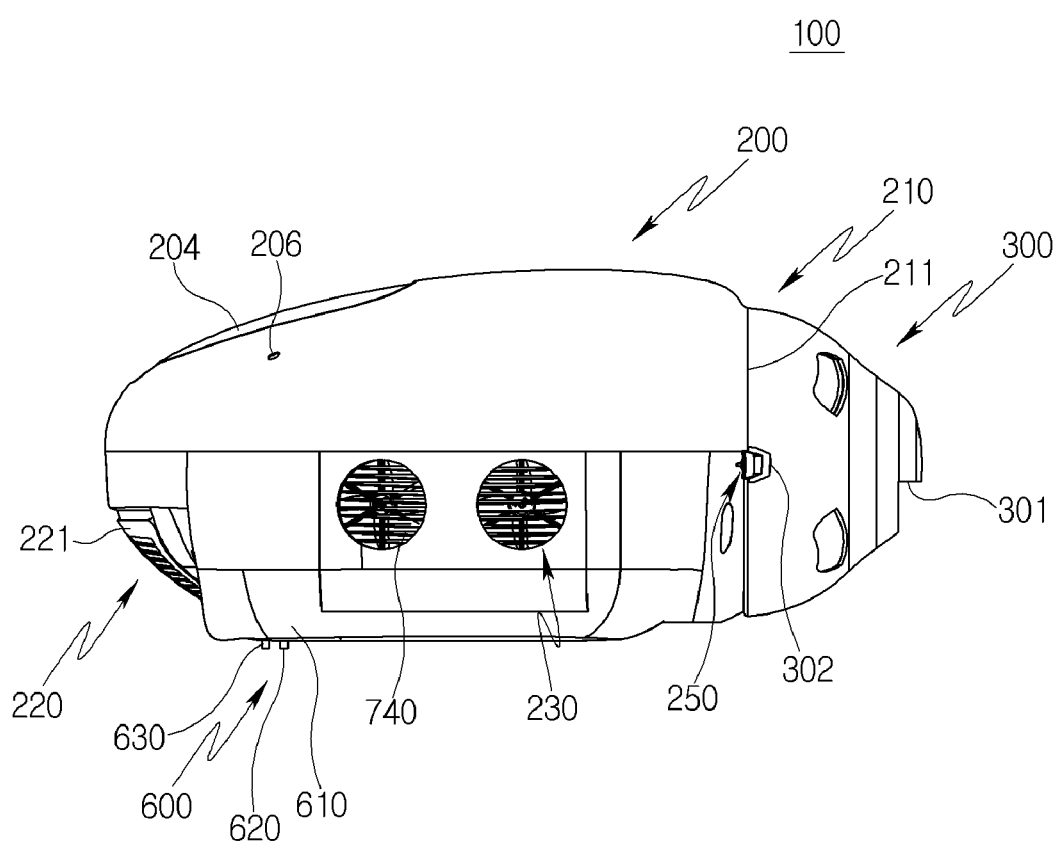

【FIG. 4】
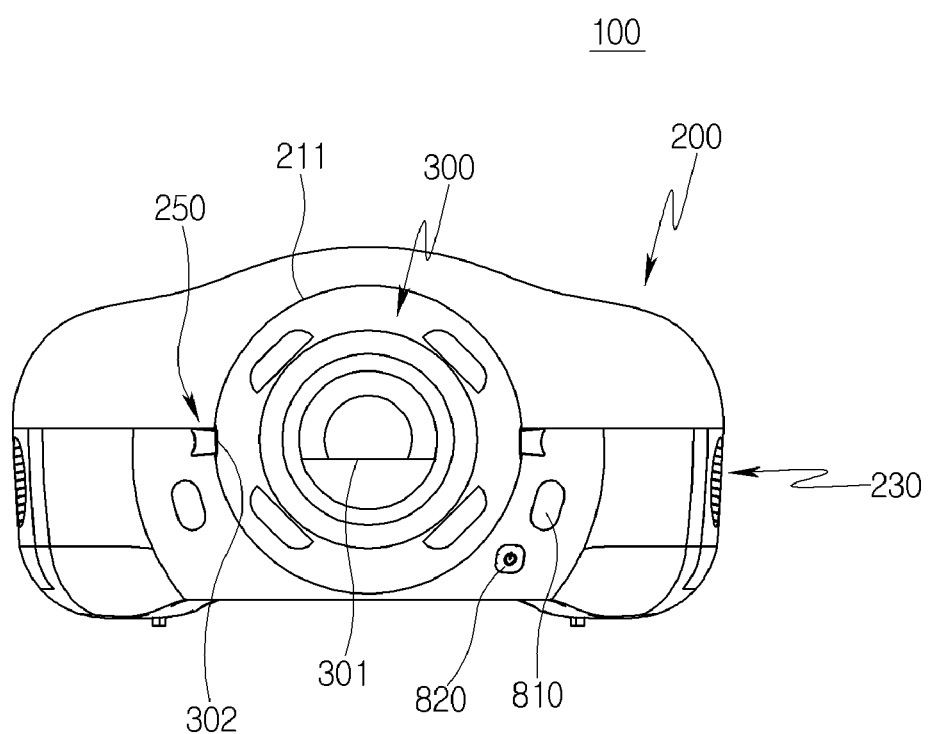

[FIG. 5]
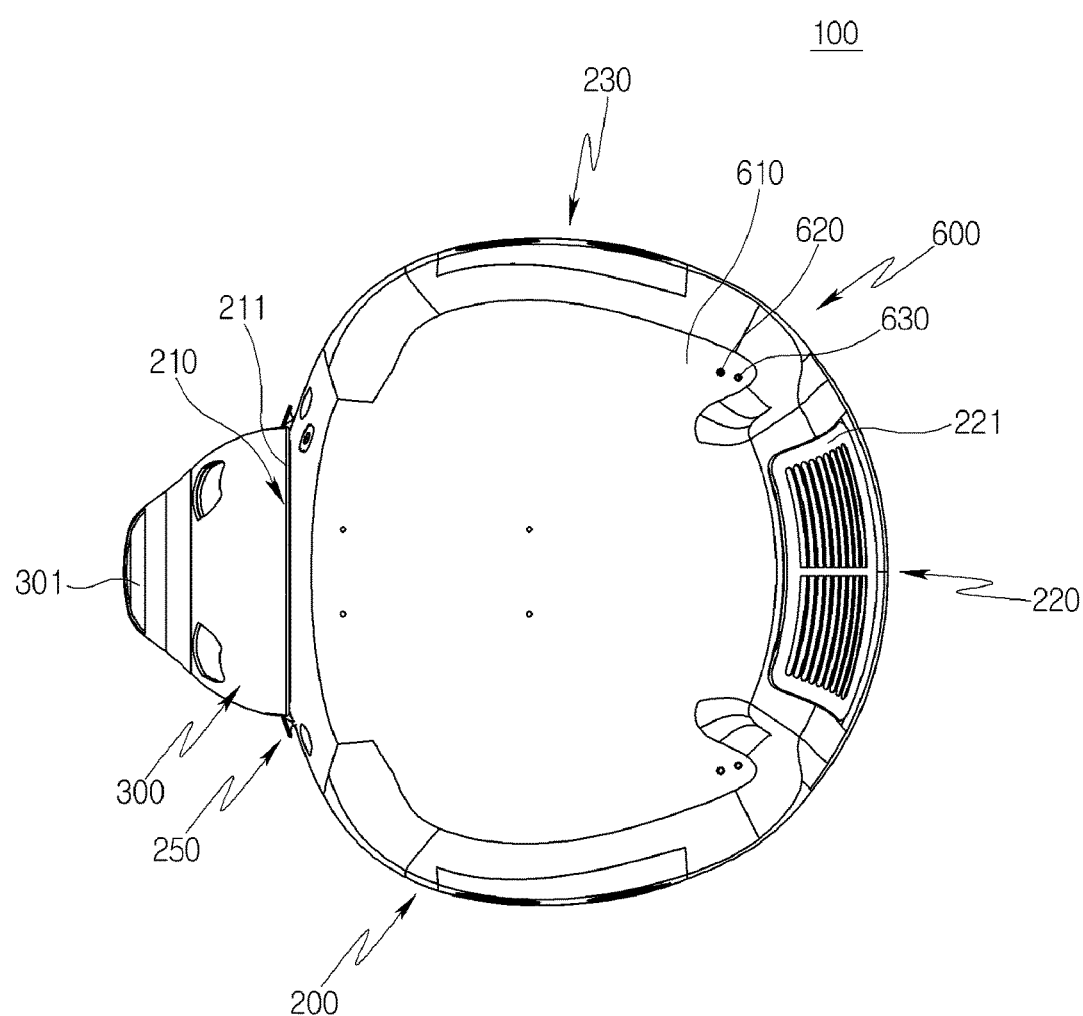

[FIG. 6]
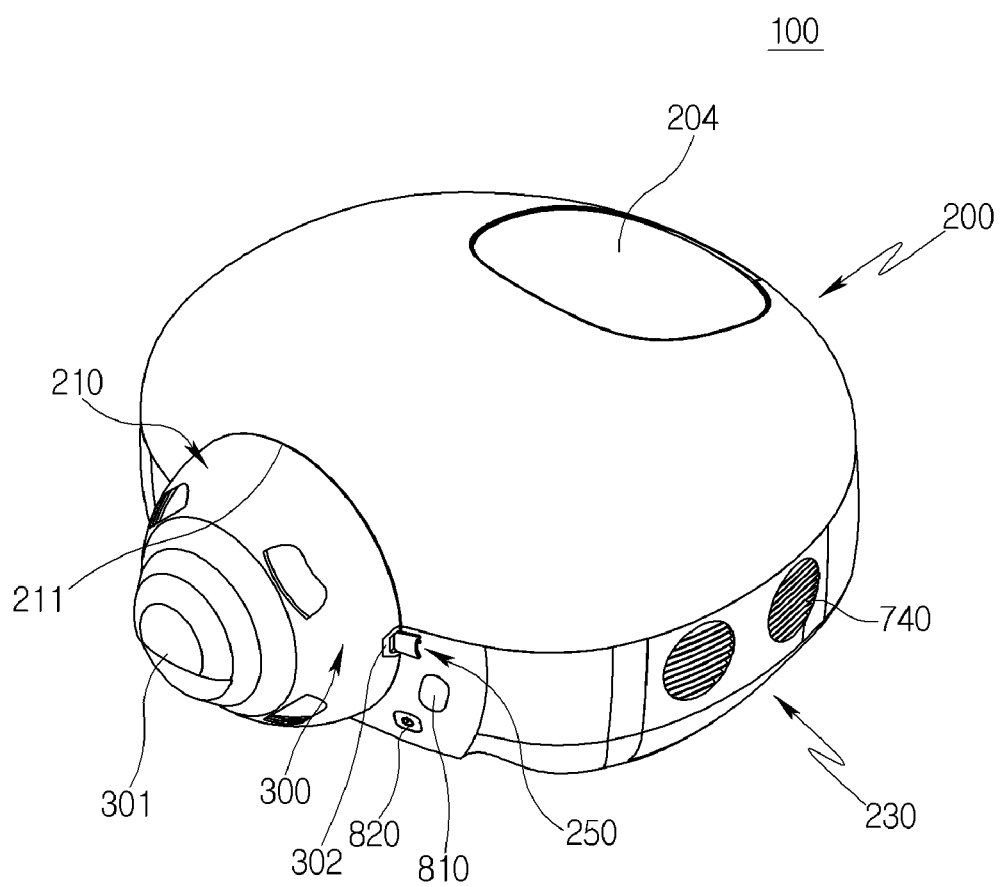

[FIG. 7]
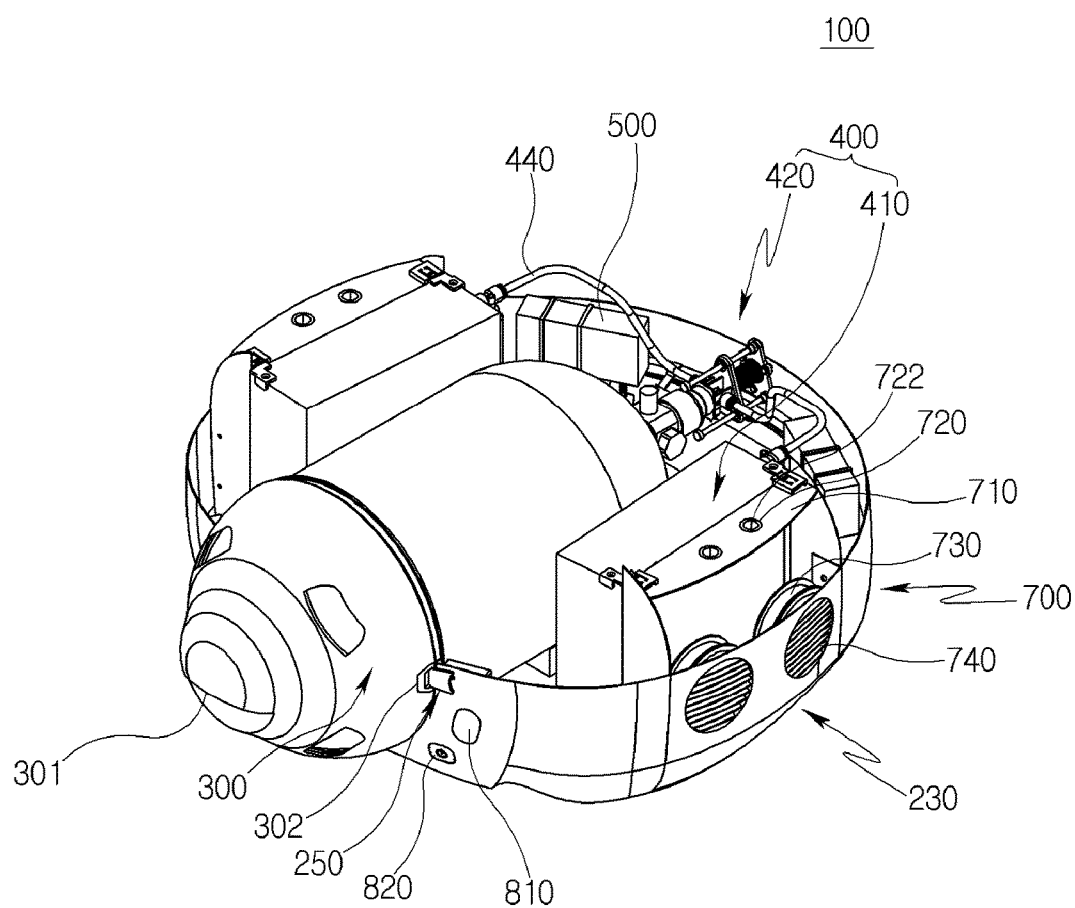

【FIG. 8】
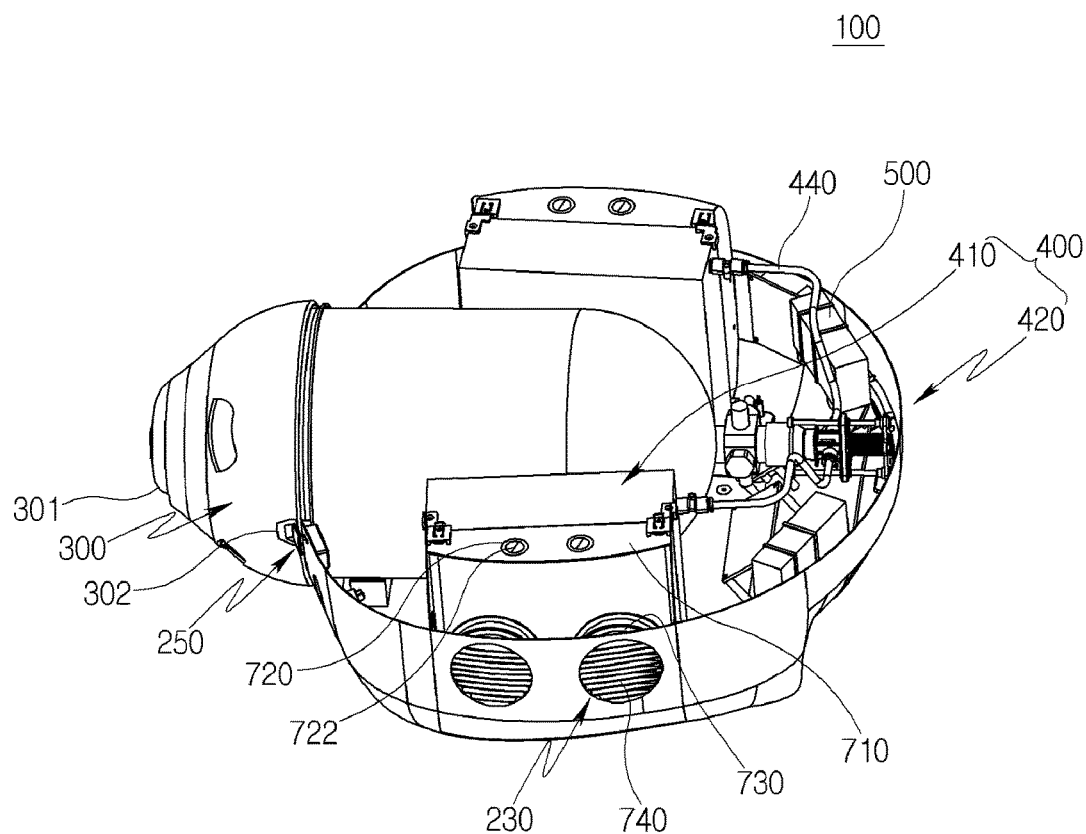

[FIG. 9]
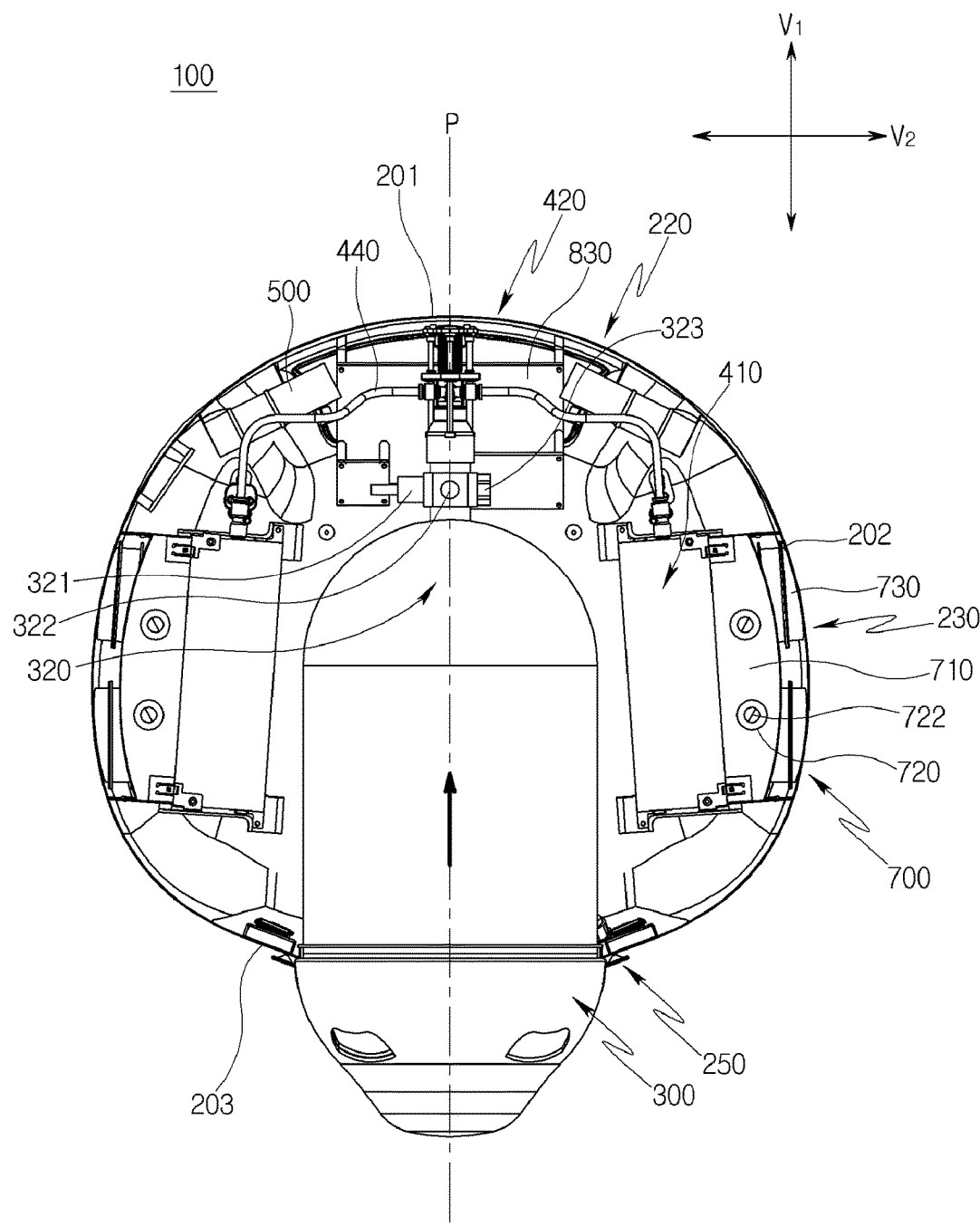

[FIG. 10]
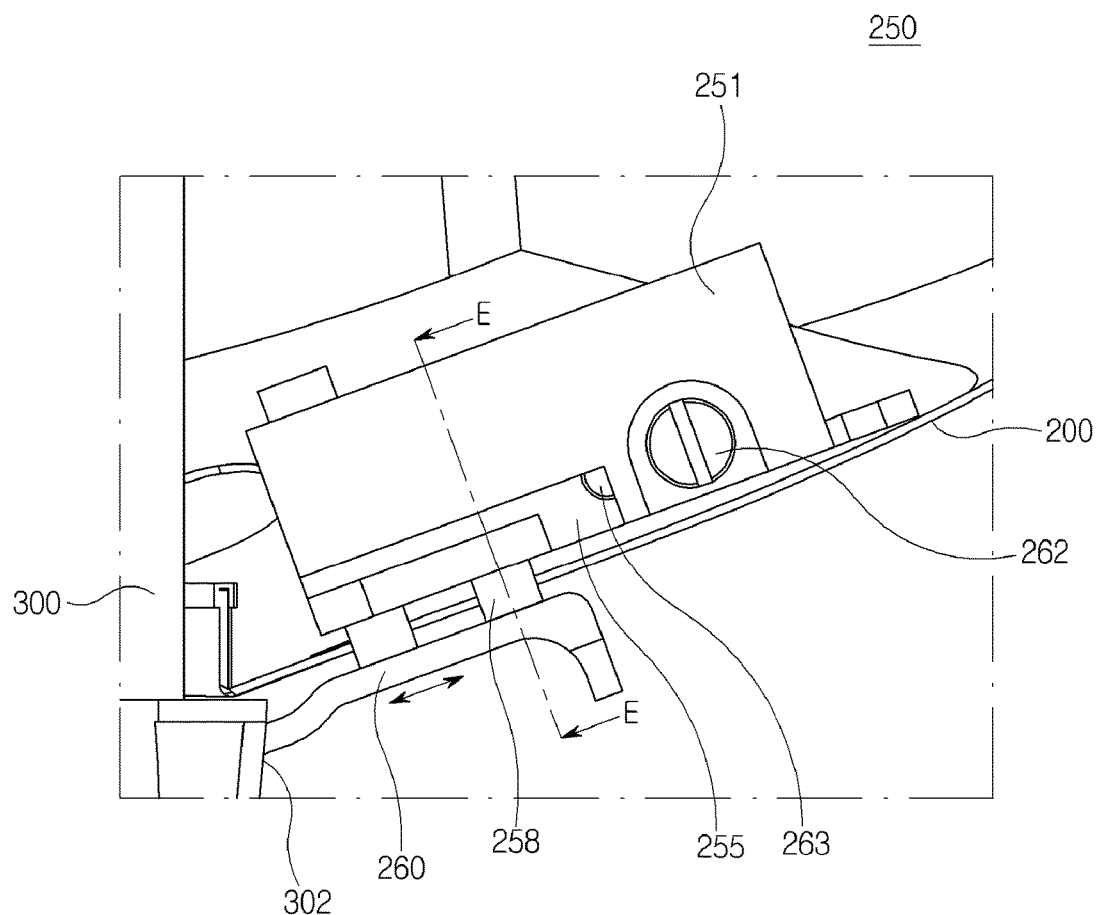

[FIG. 11]
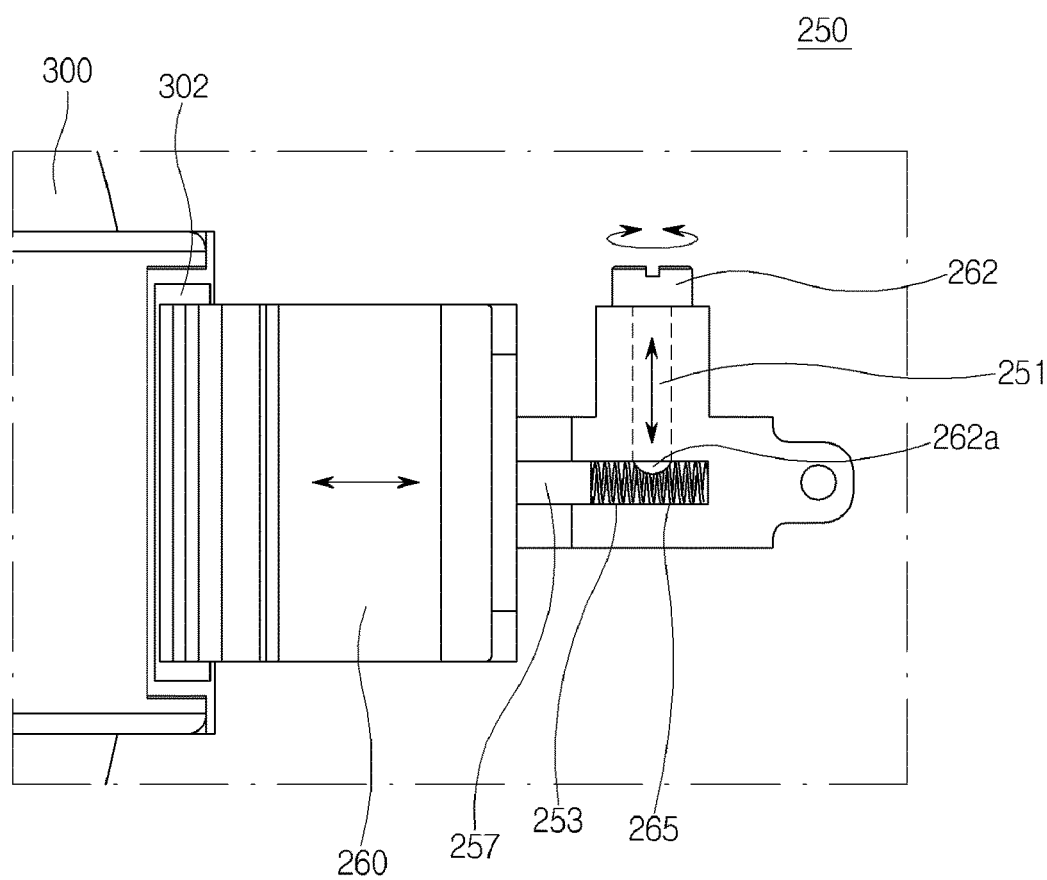

[FIG. 12]
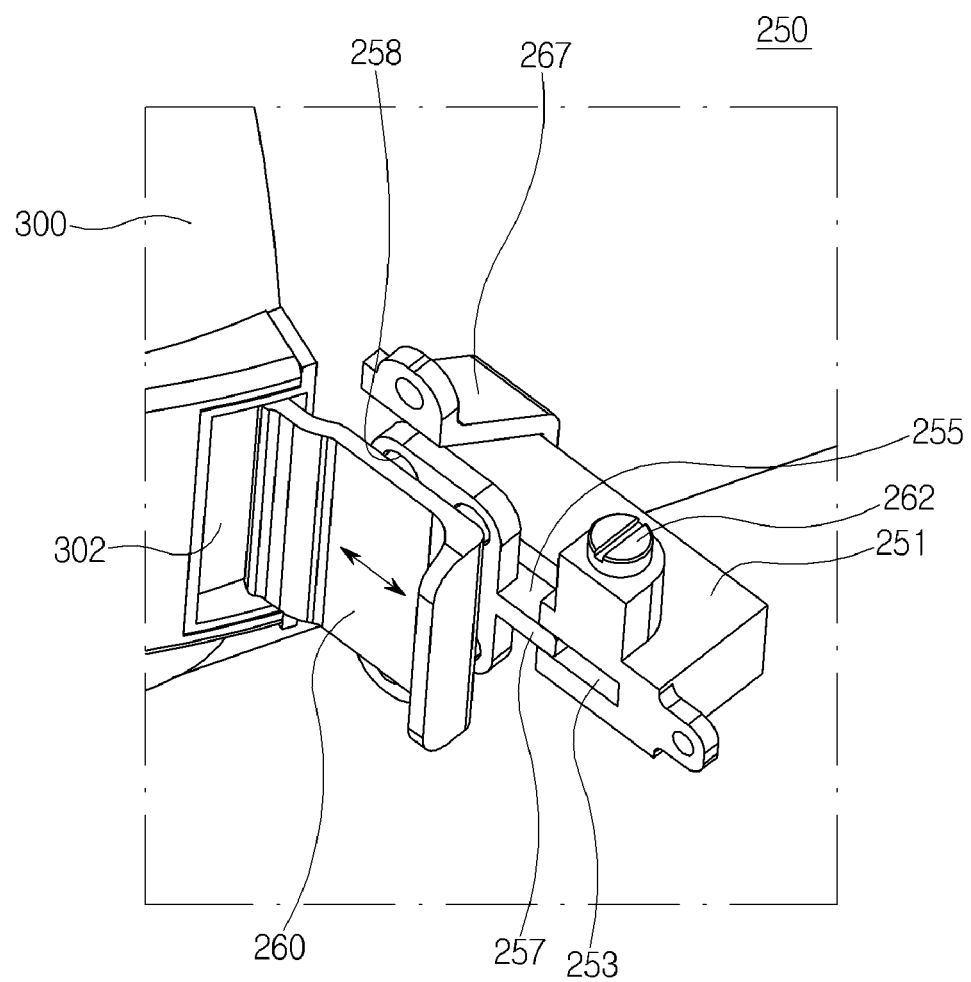

[FIG. 13]
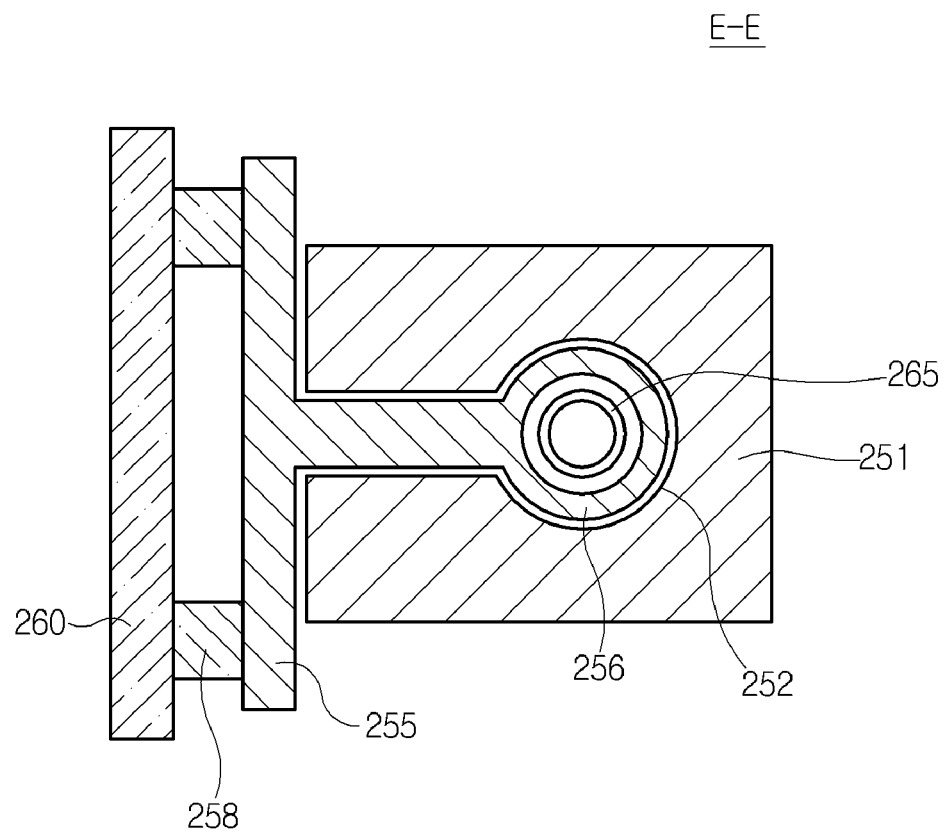

【FIG. 14a】
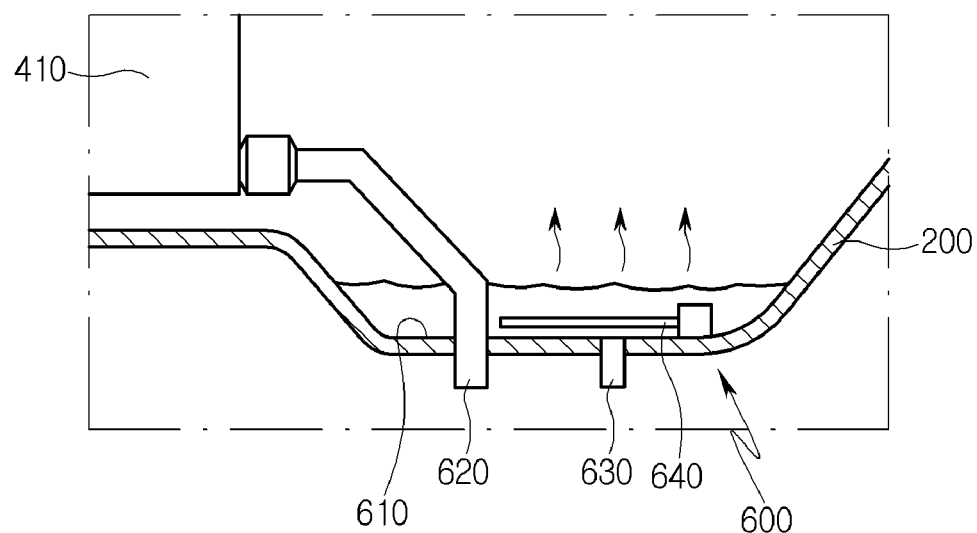
【FIG. 14b】
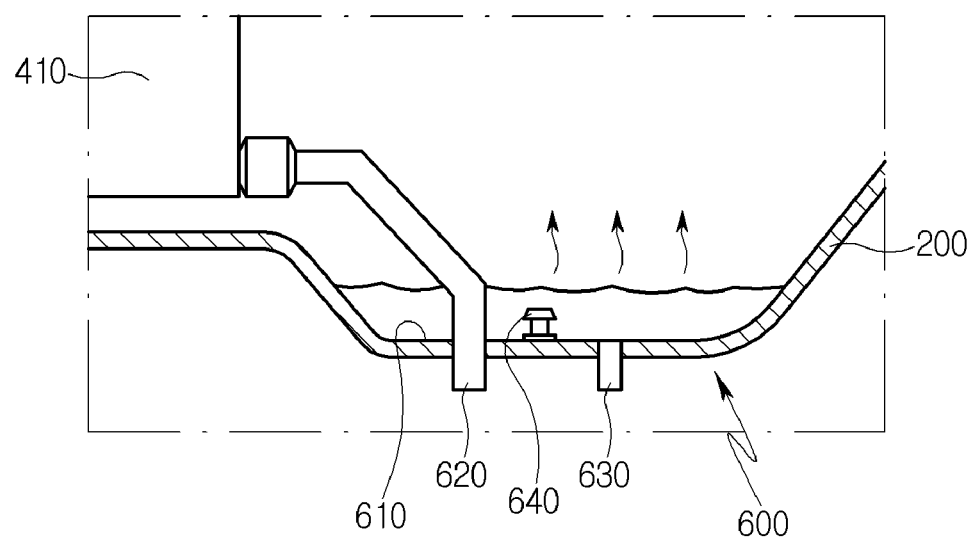

【FIG. 15a】
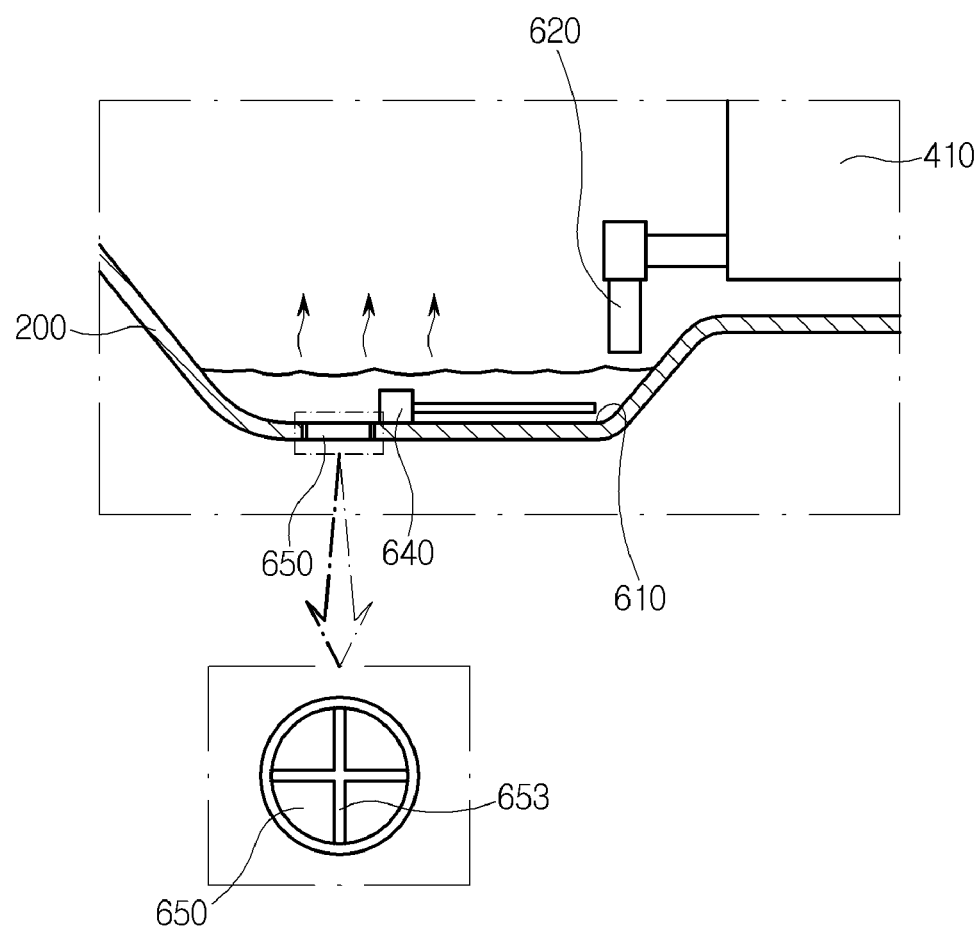

[FIG. 15b]
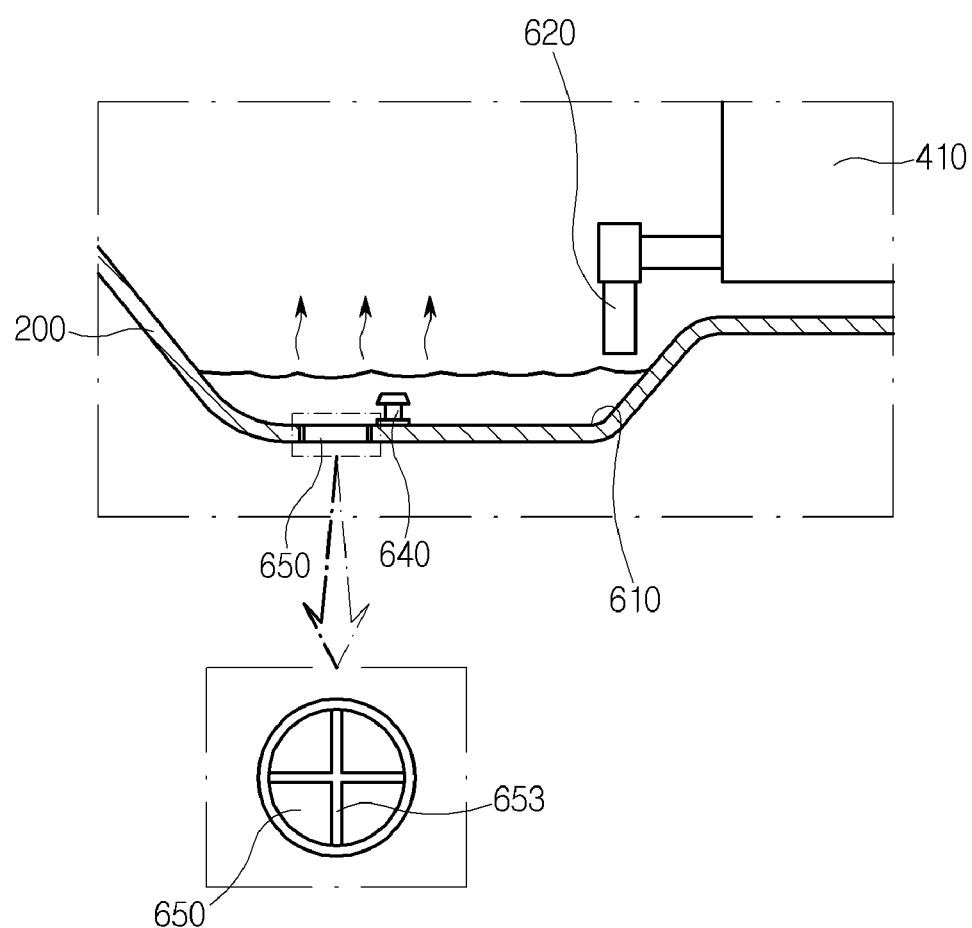

[FIG. 16]
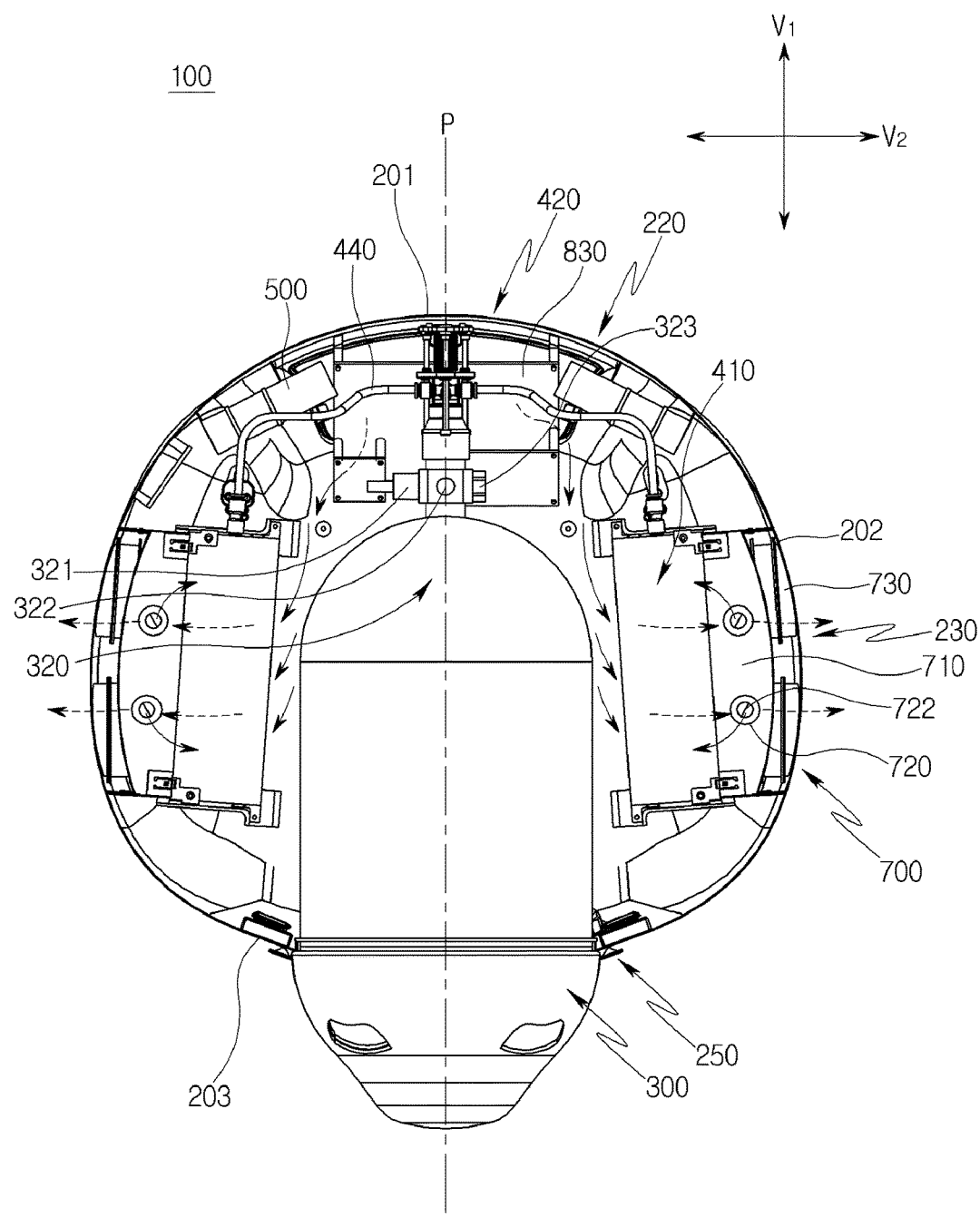

[FIG. 17]
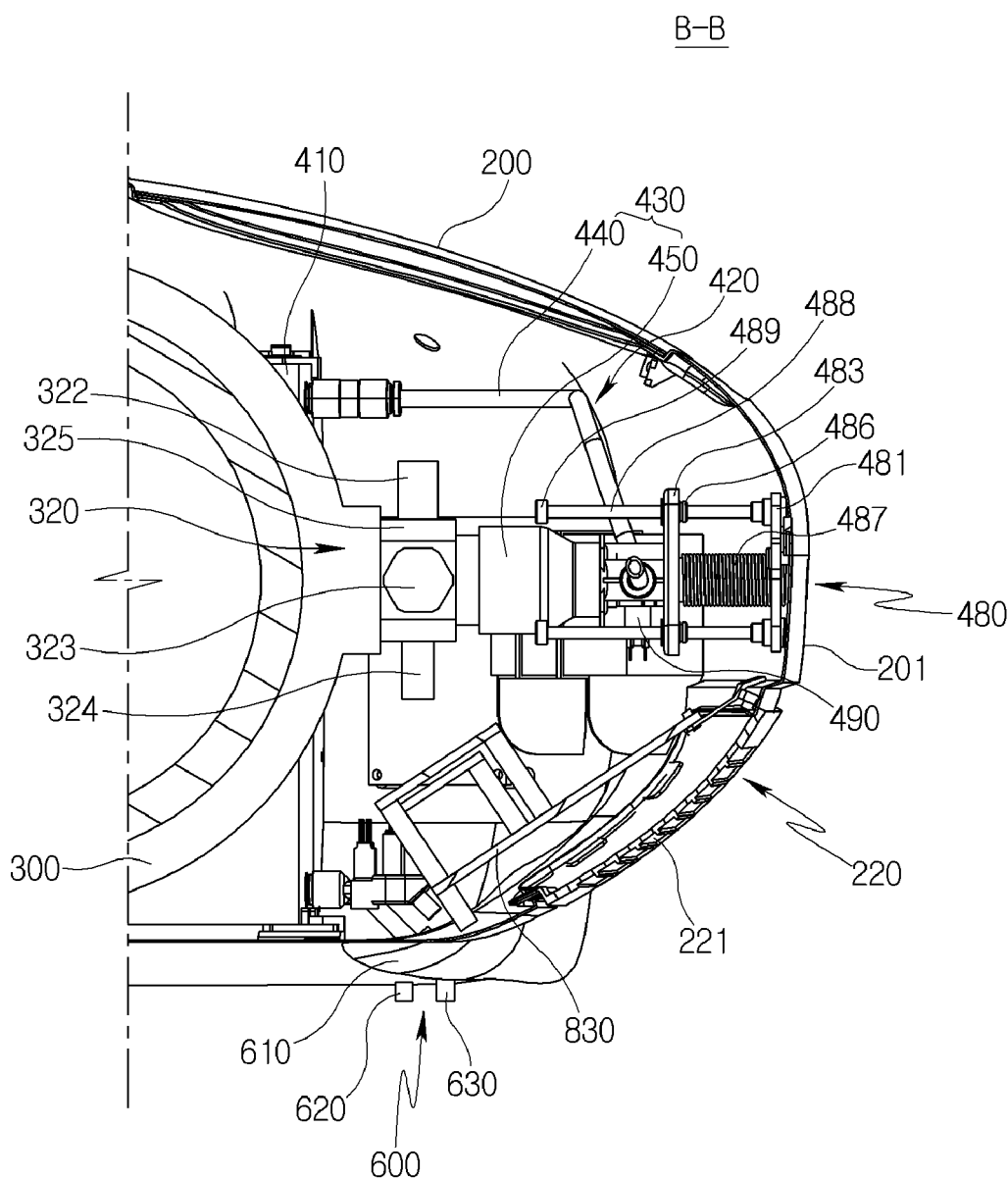

【FIG. 18a】
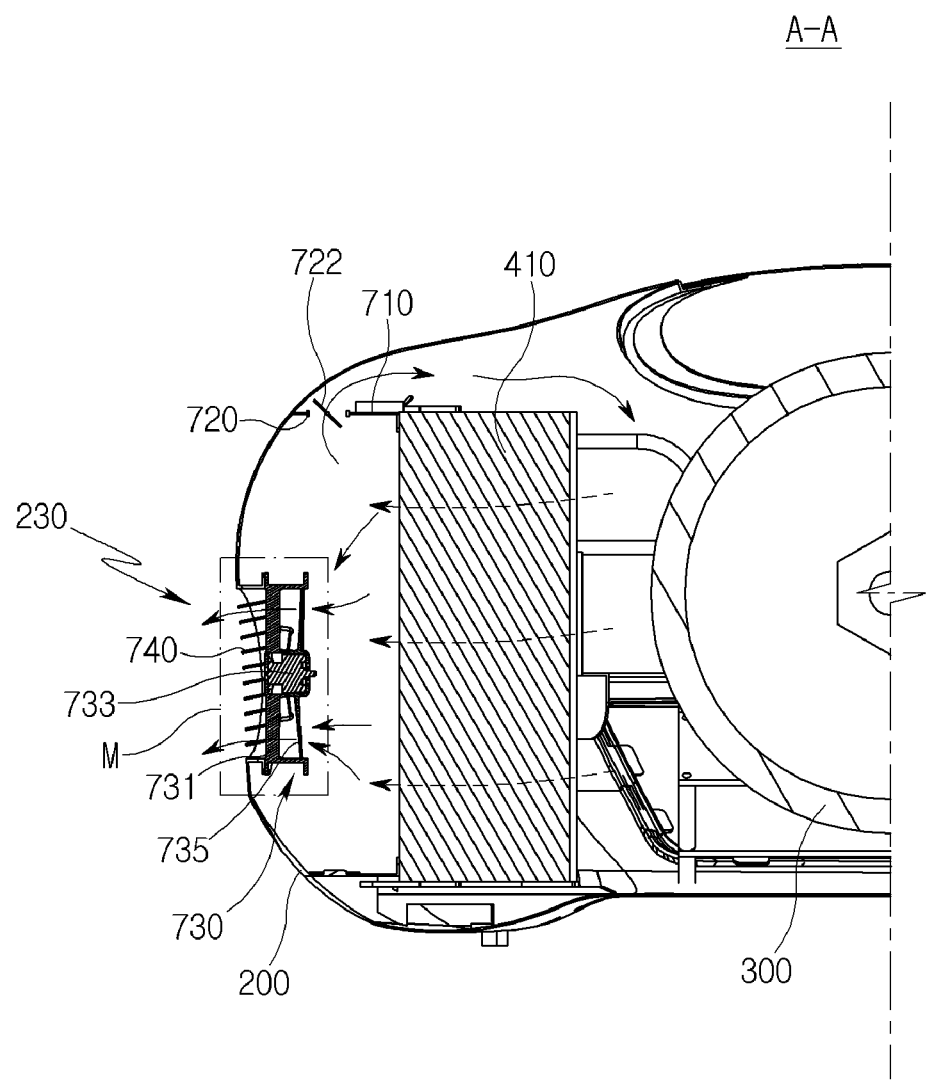

[FIG. 18b]
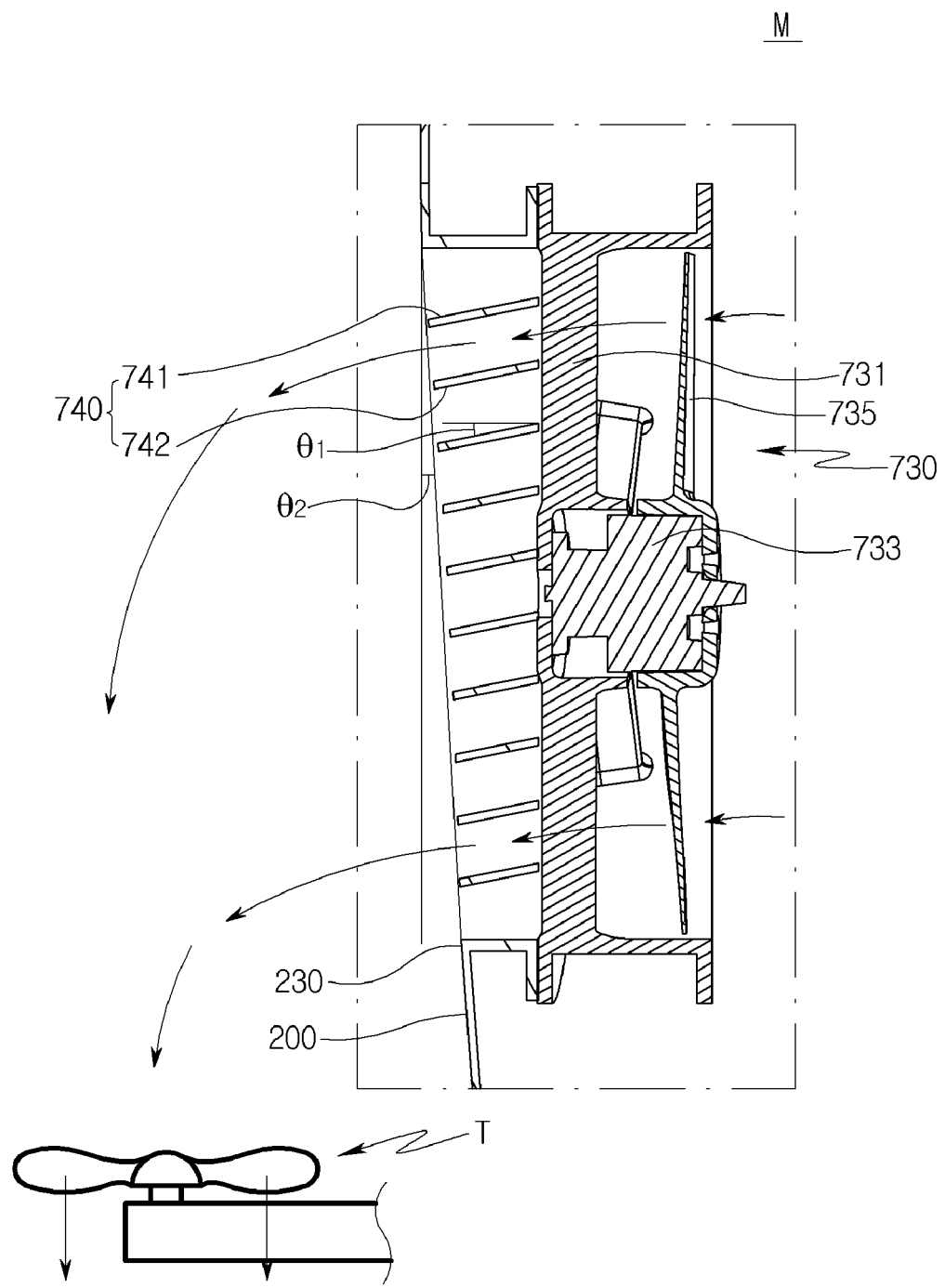

[FIG. 19a]
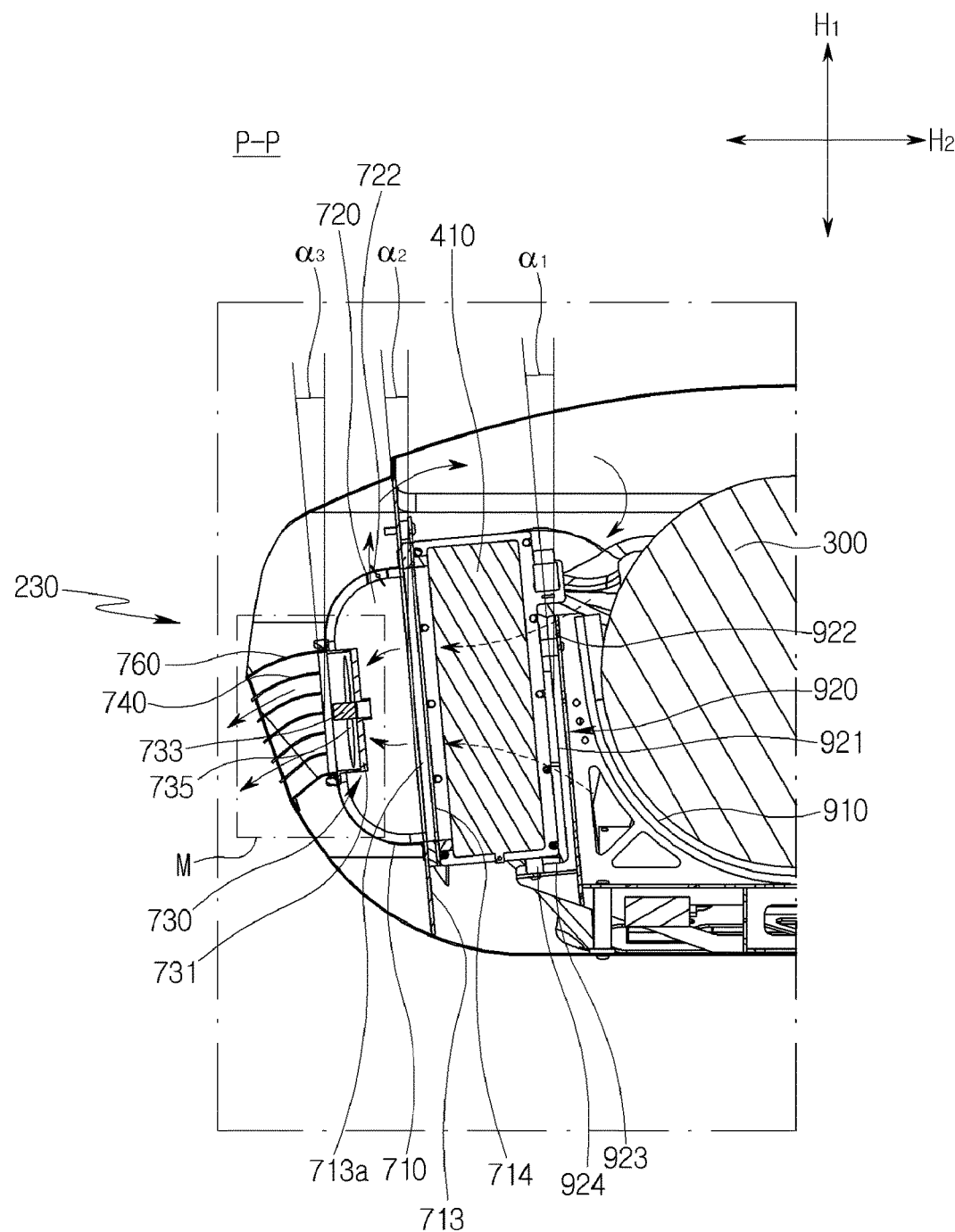

[FIG. 19b]
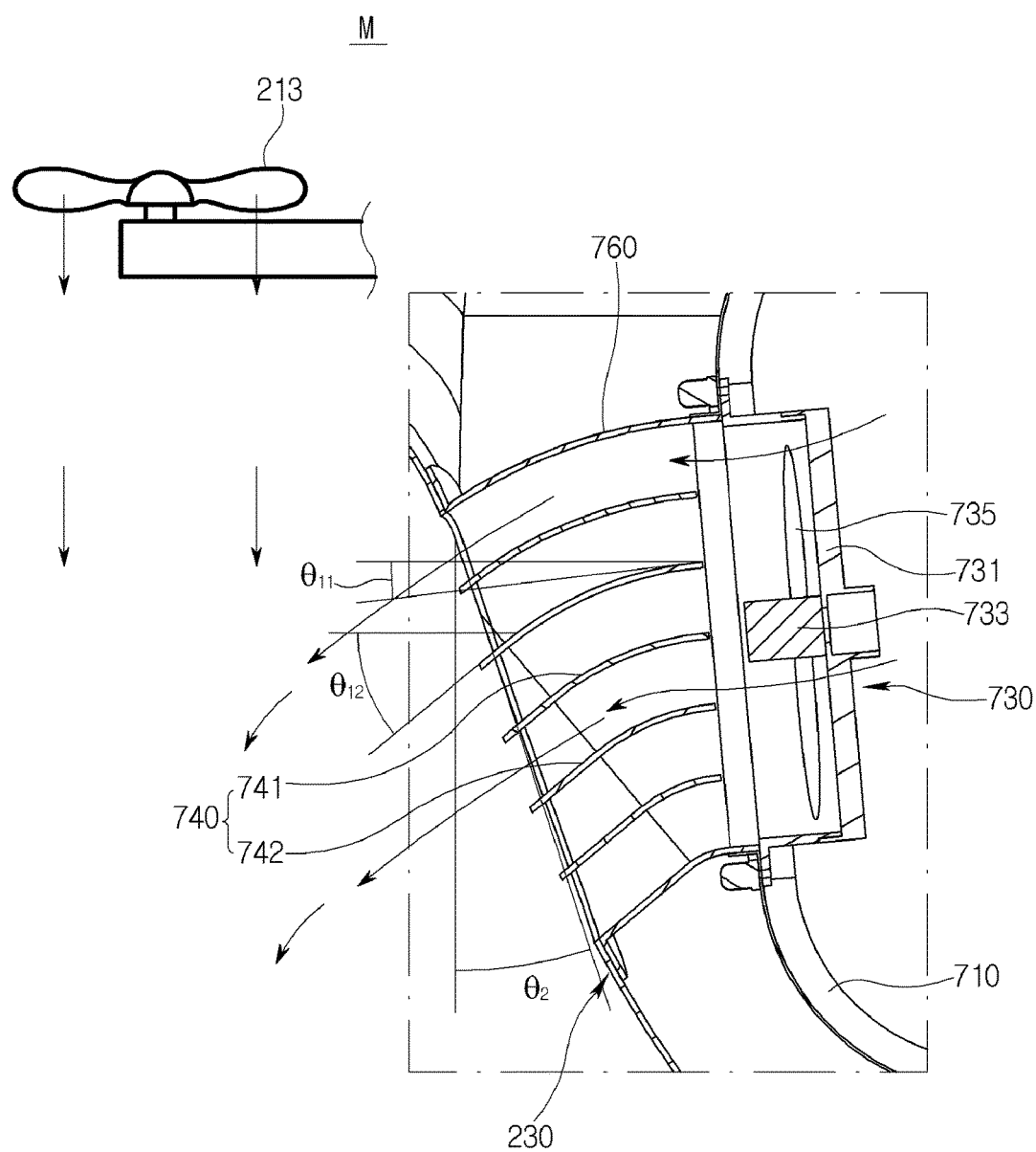

[FIG. 20a]
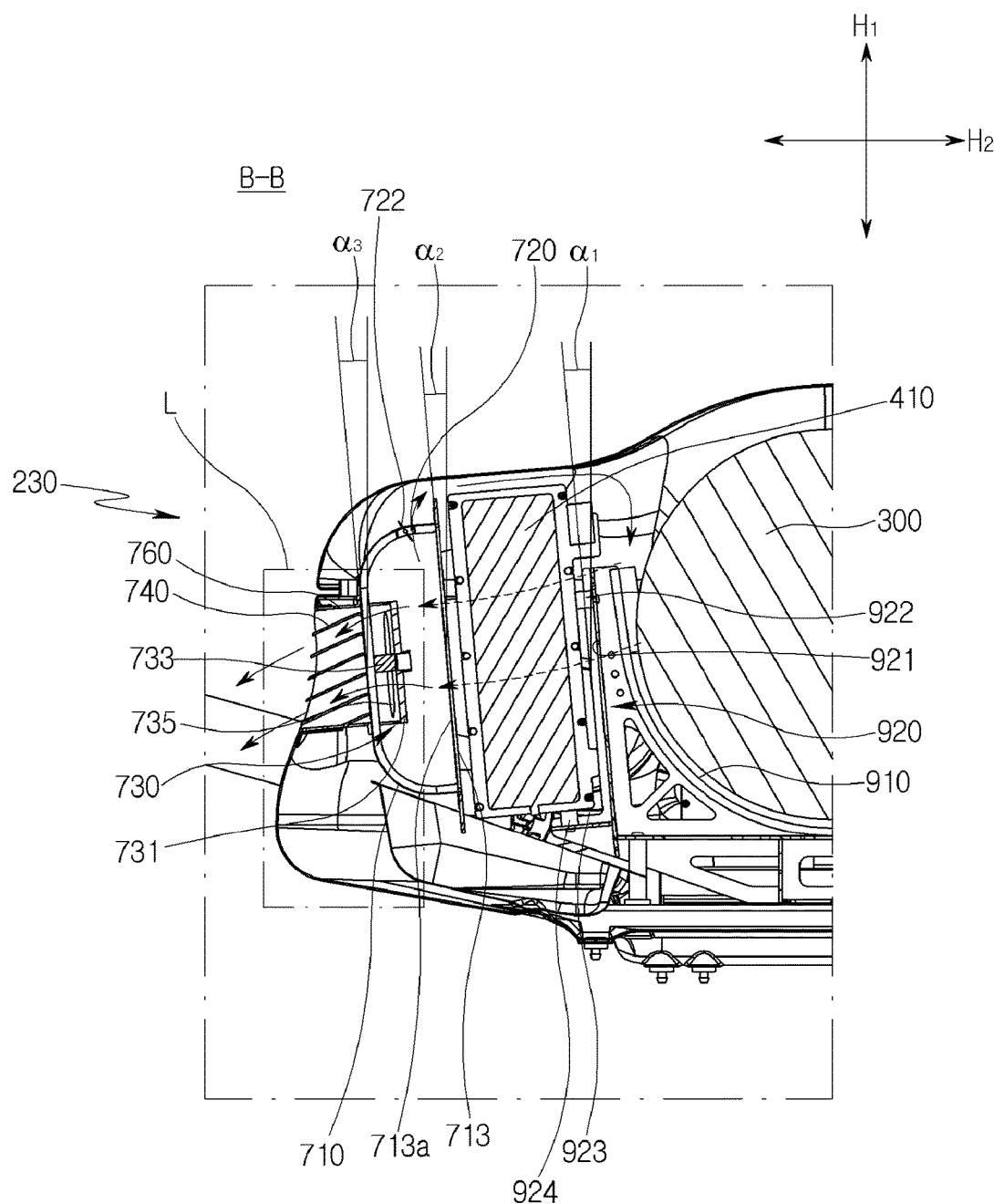

[FIG. 20b]
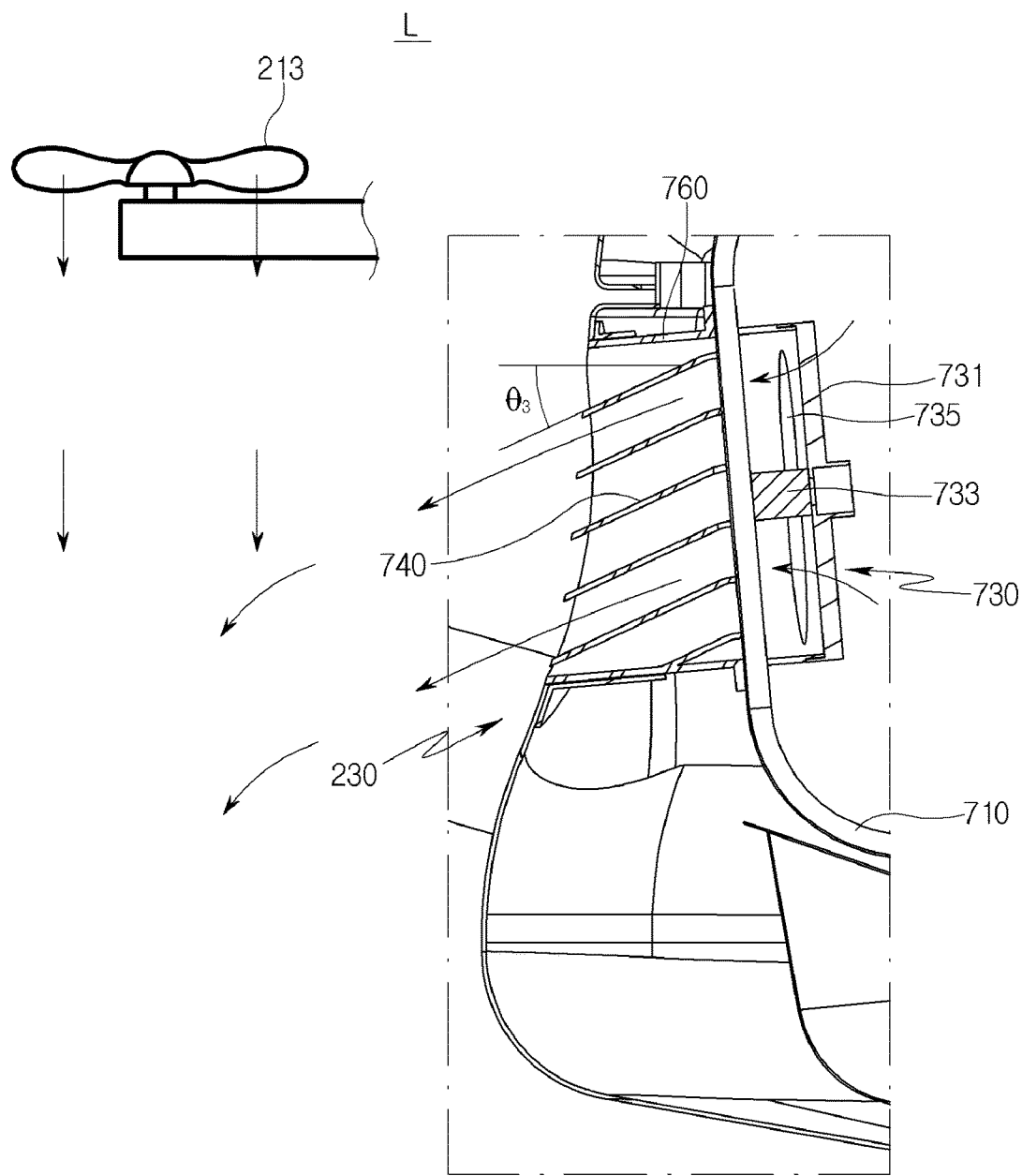

[FIG. 21]
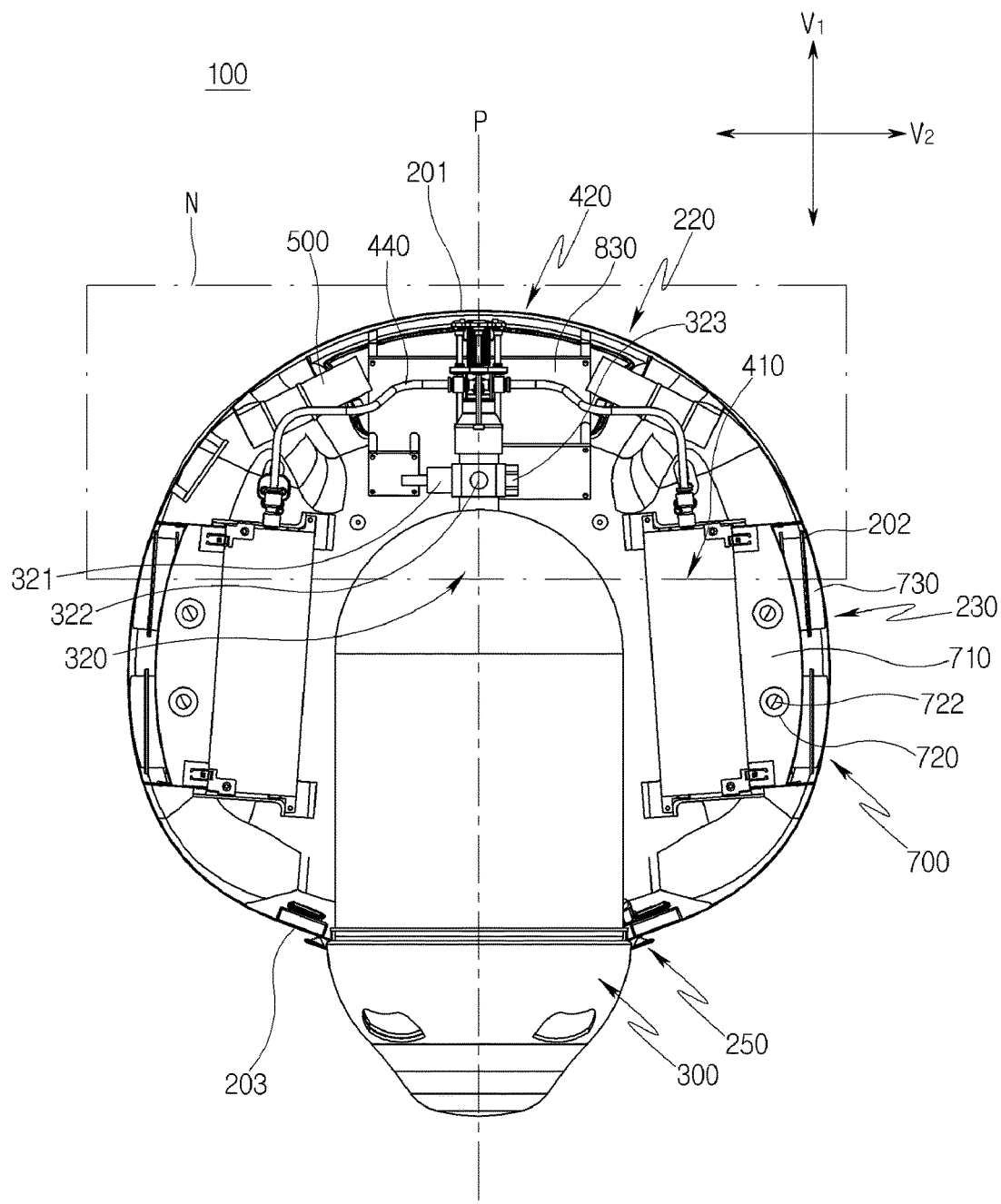

[FIG. 22]
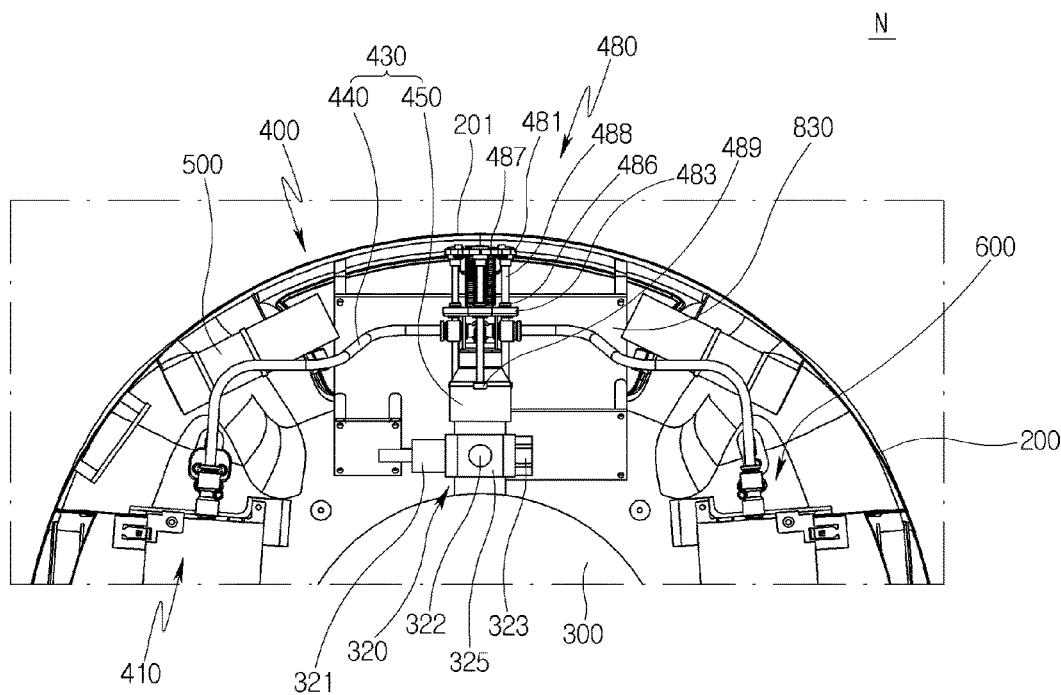

[FIG. 23]
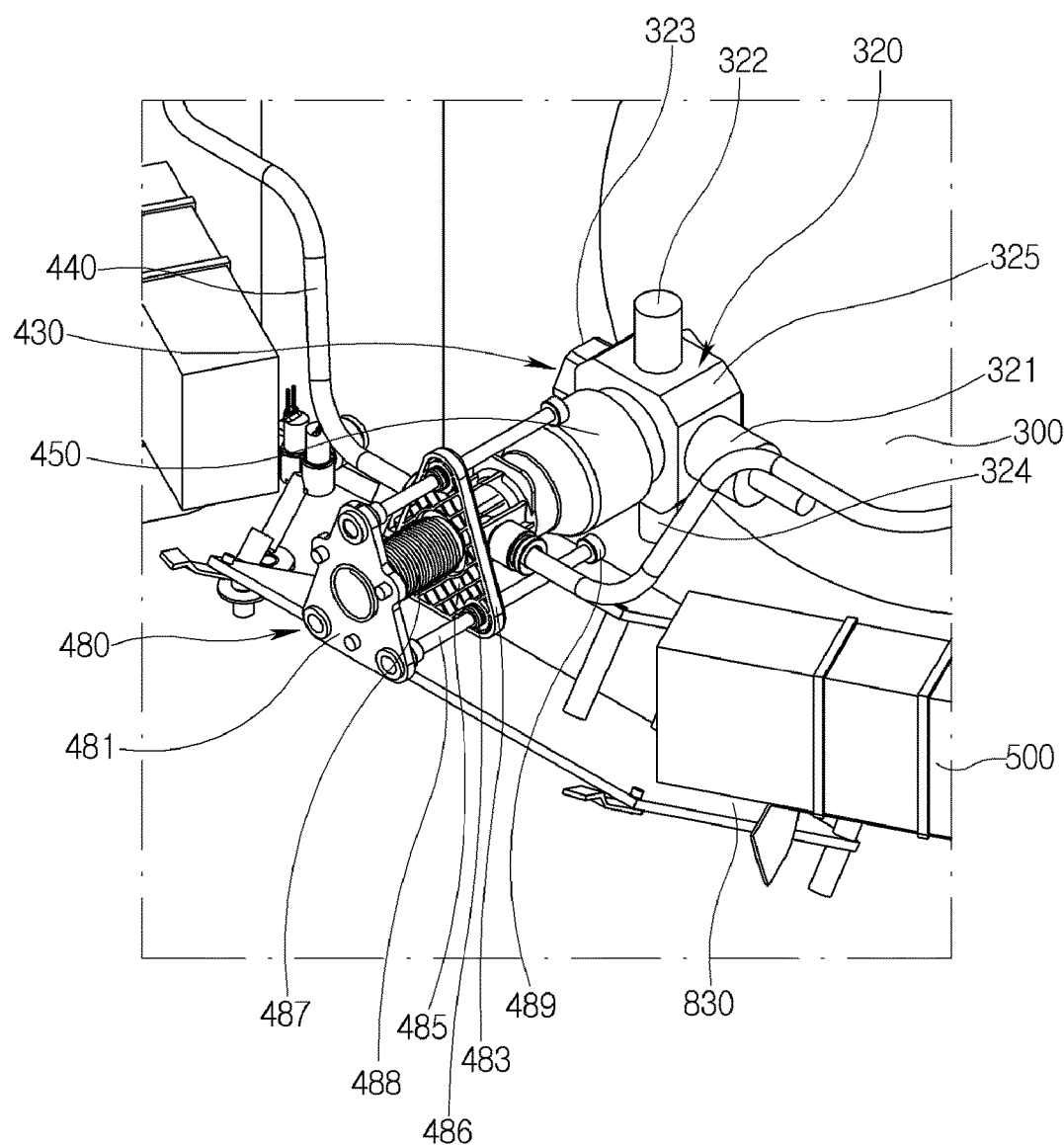

[FIG. 24a]
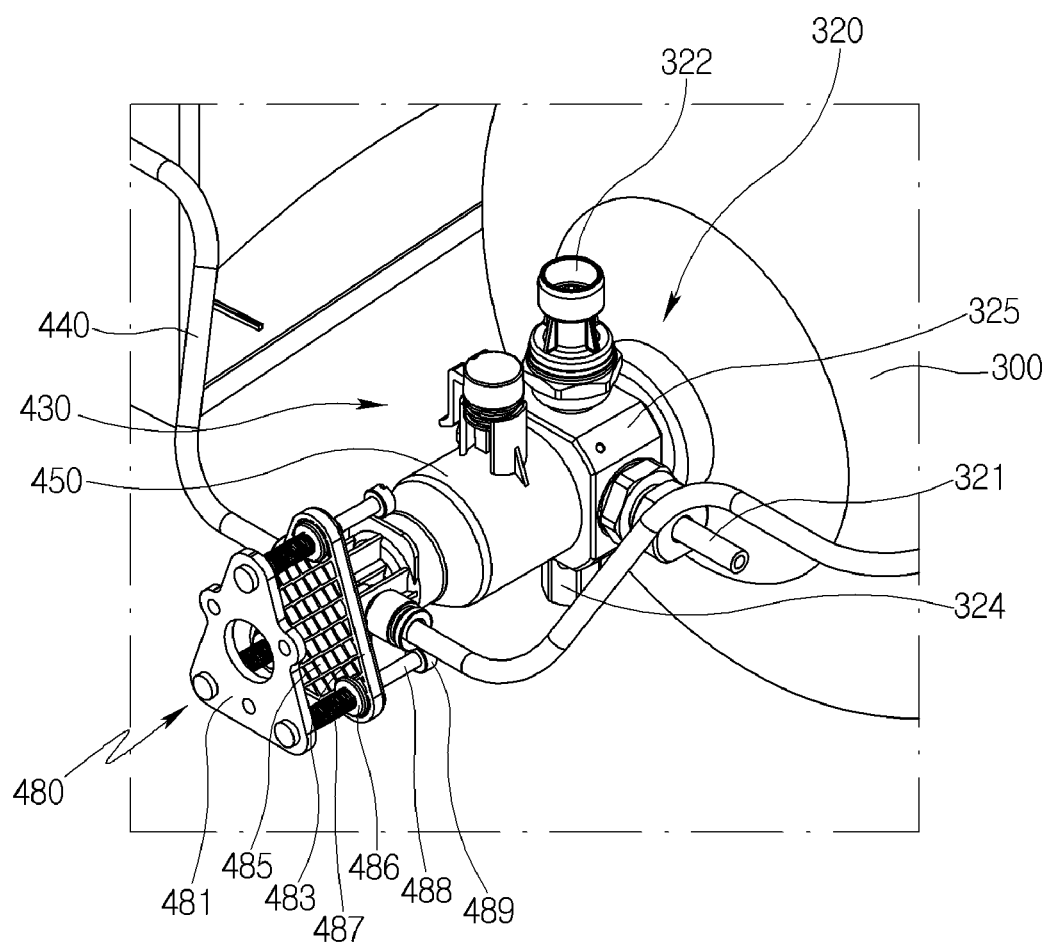

【FIG. 24b】
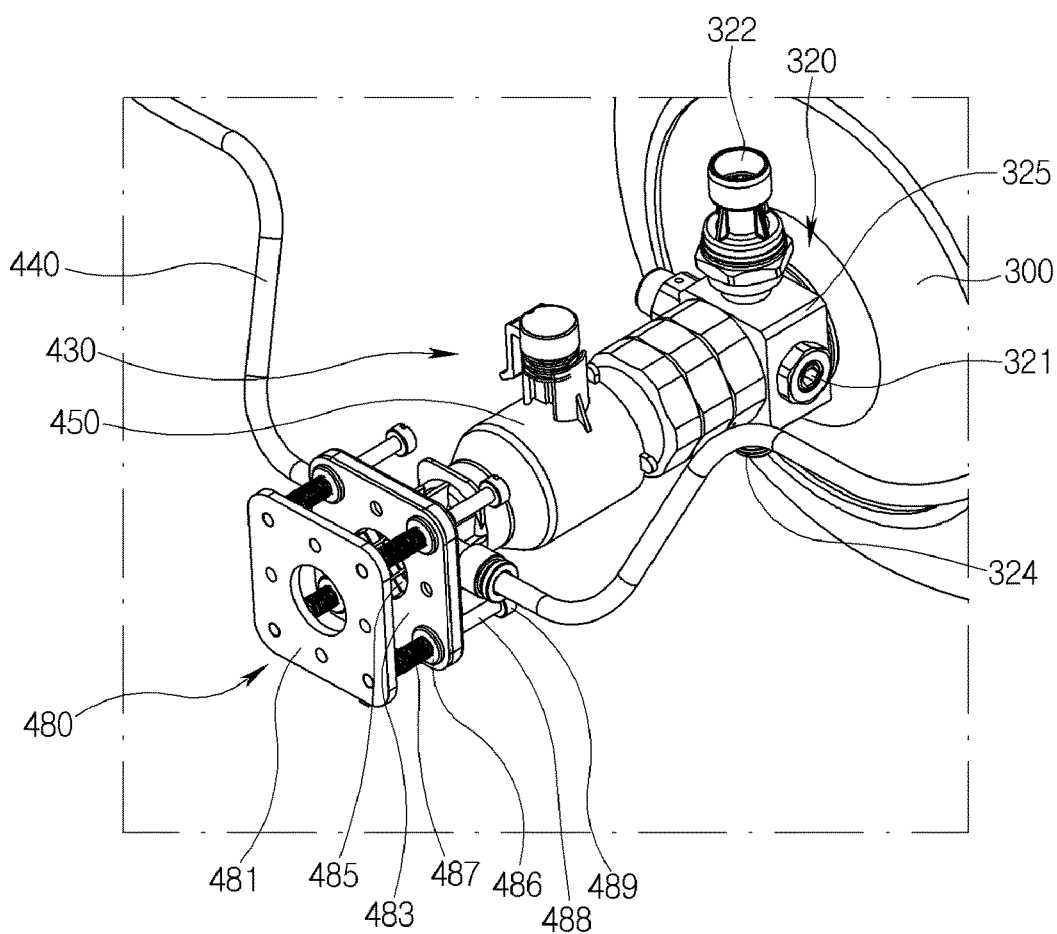

[FIG. 25]
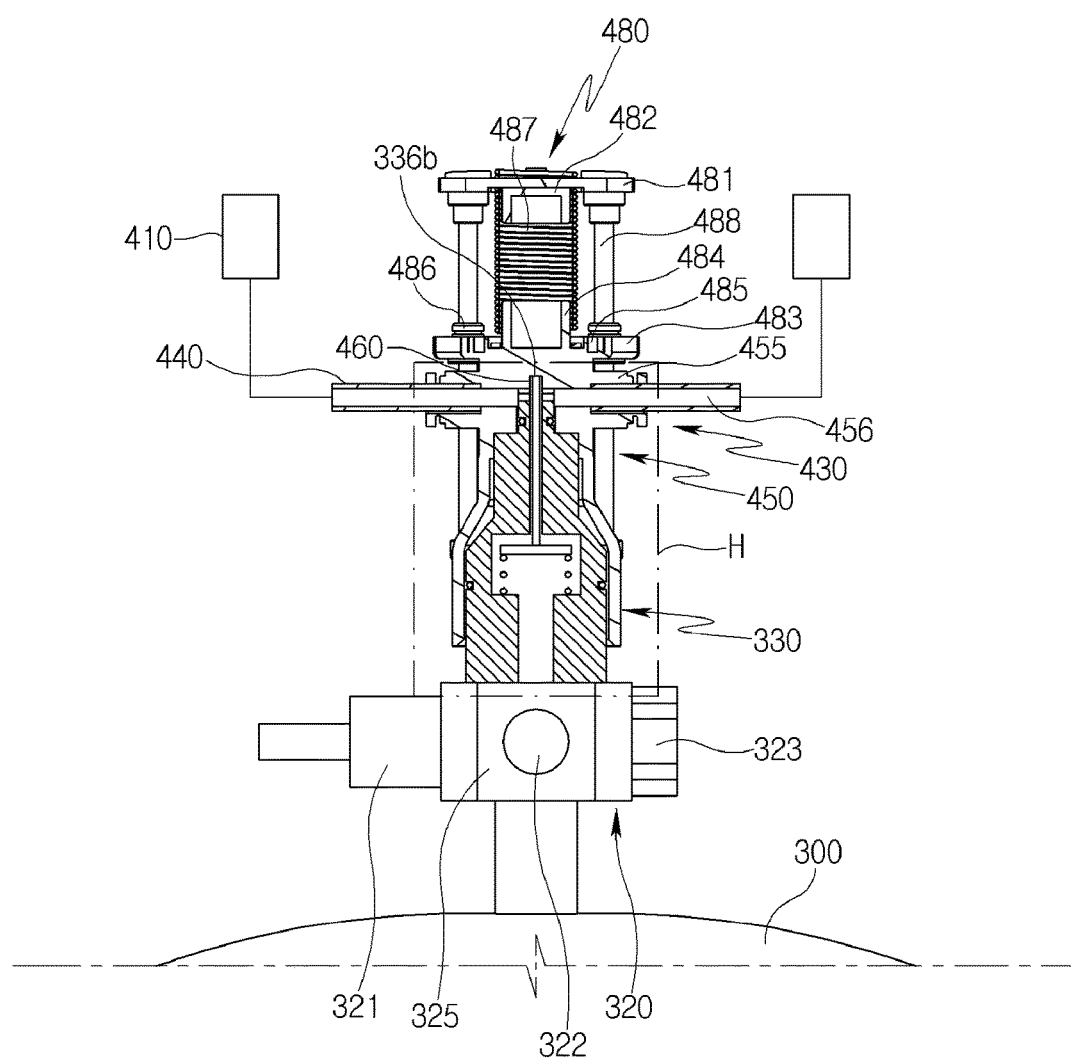

[FIG. 26]
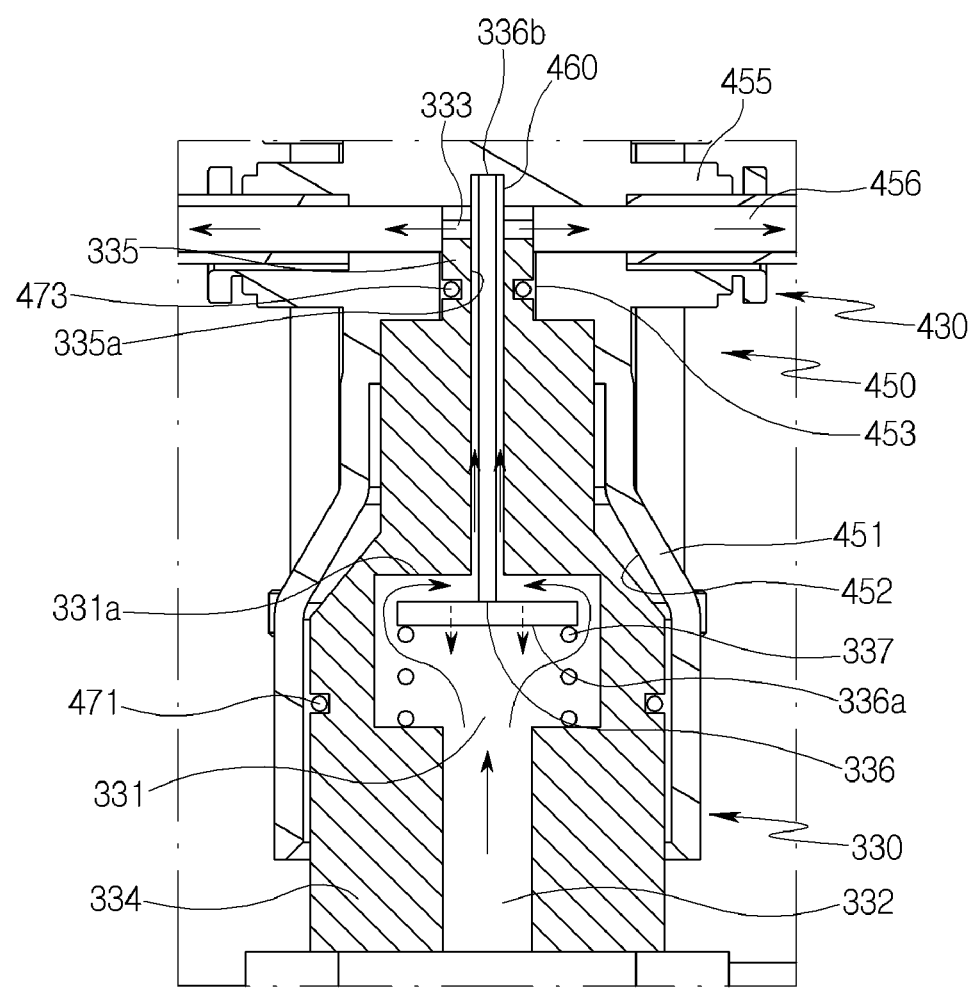

[FIG. 27]
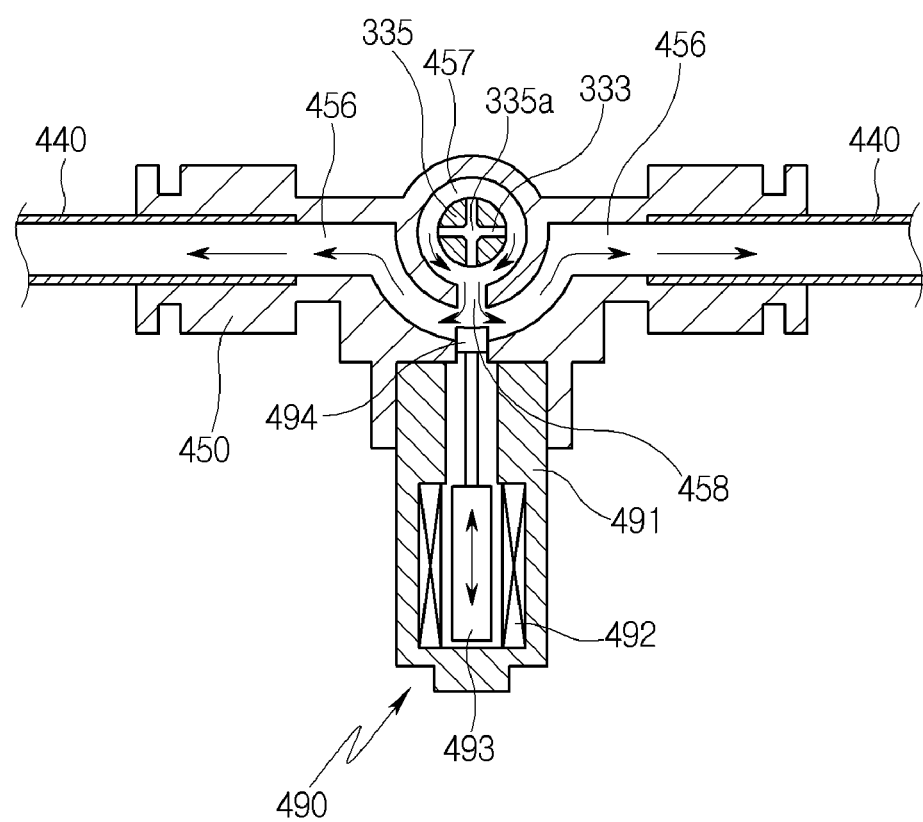

[FIG. 28]
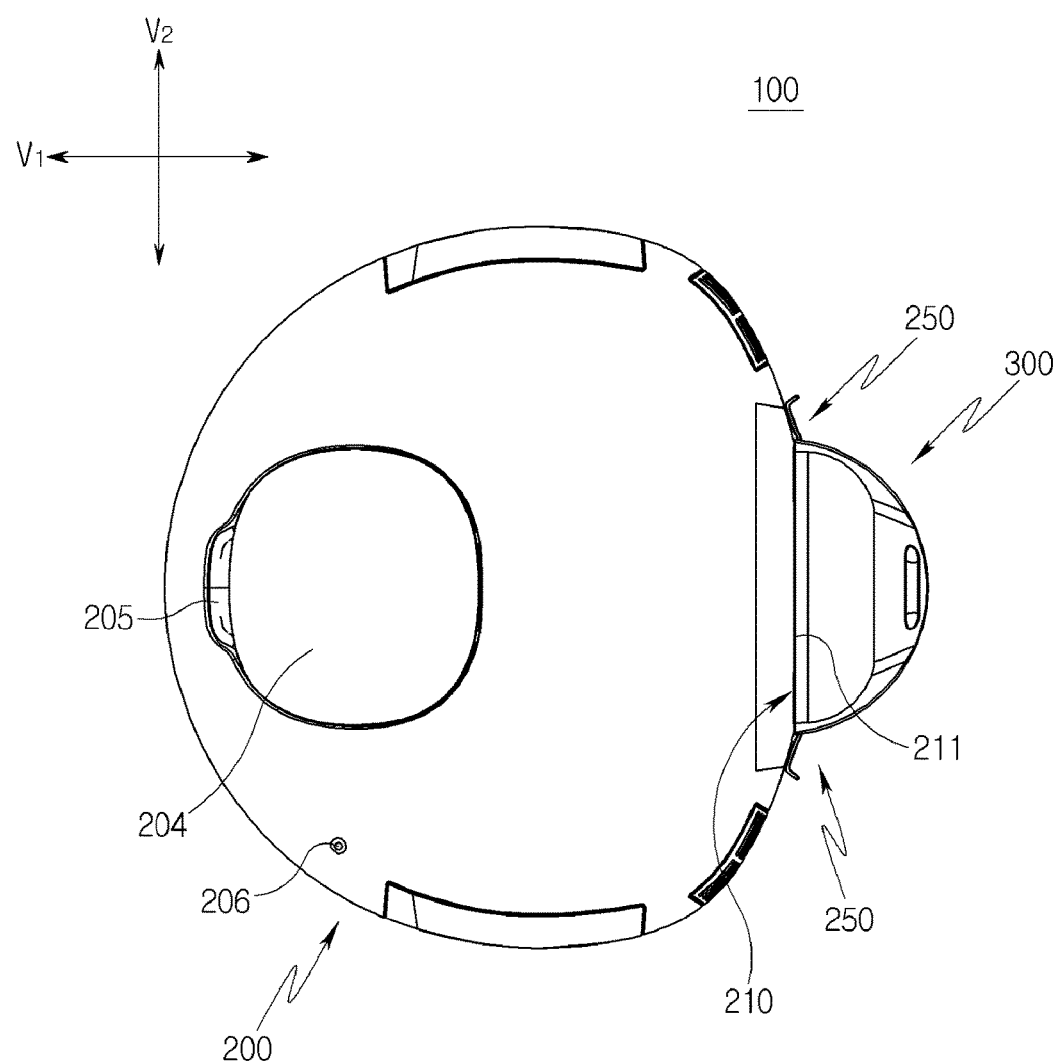

[FIG. 29]
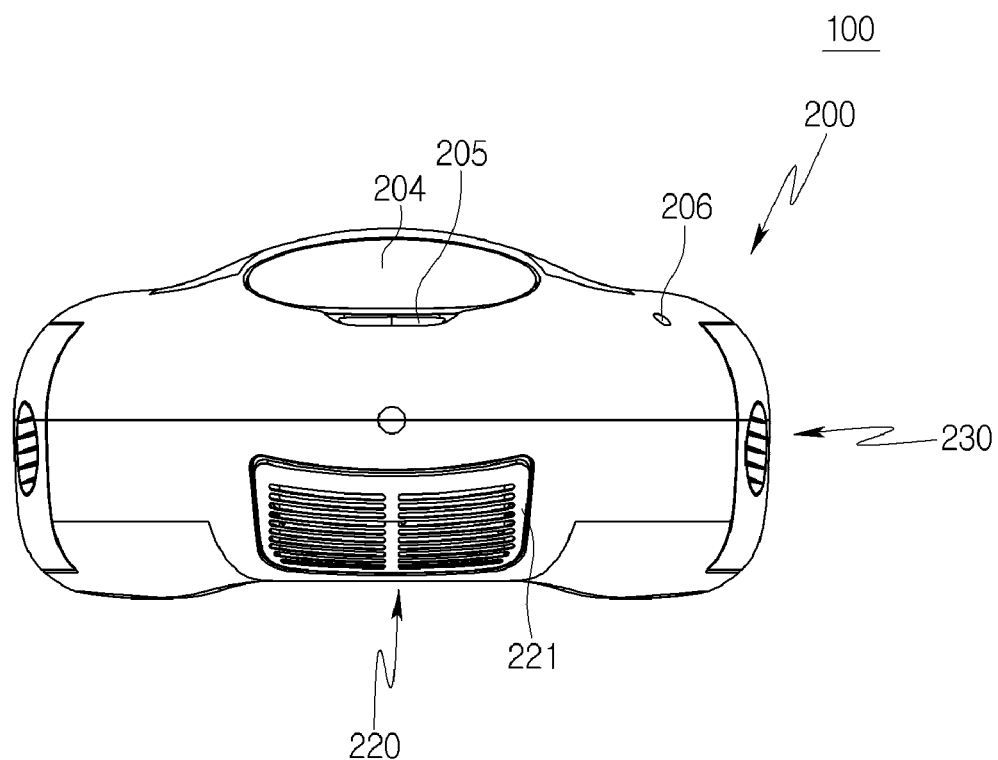

[FIG. 30]
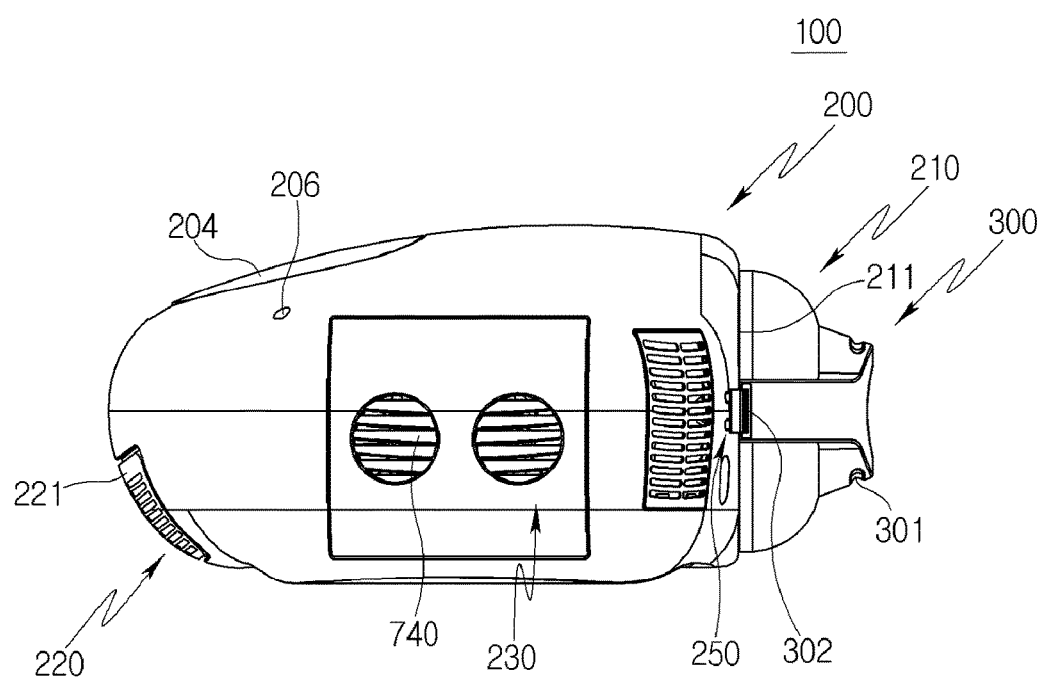

[FIG. 31]
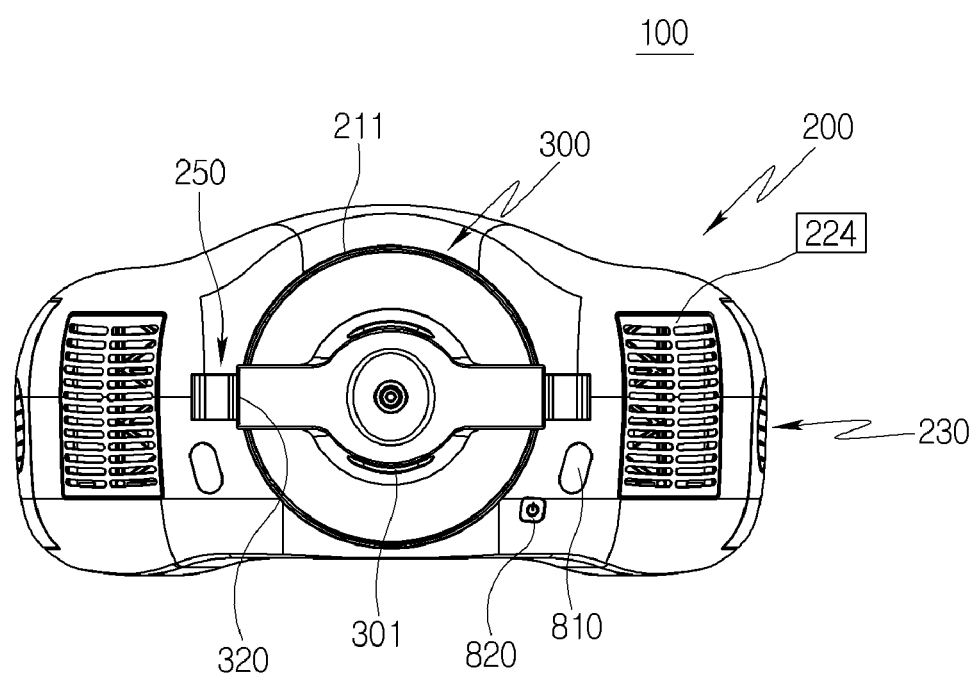

[FIG. 32]
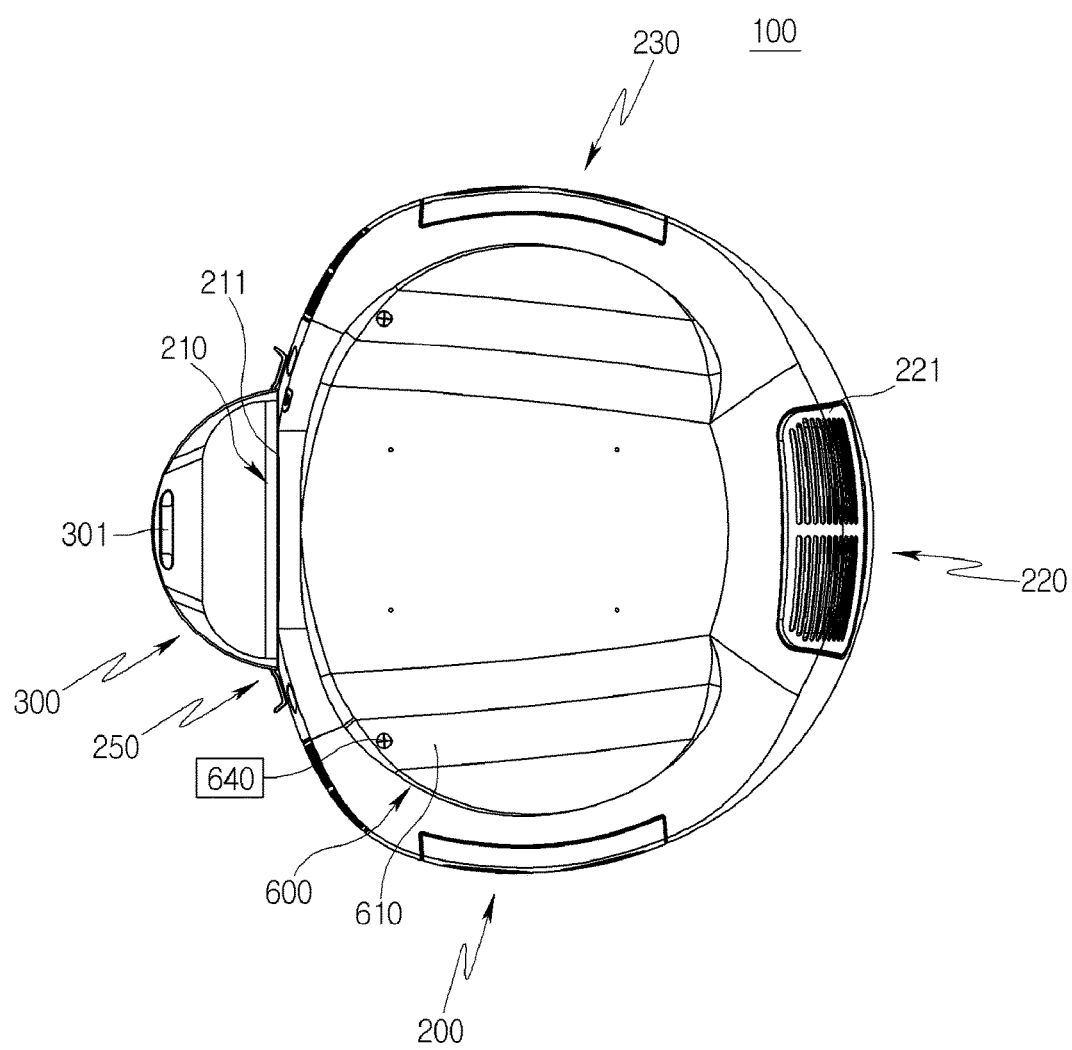

[FIG. 33]
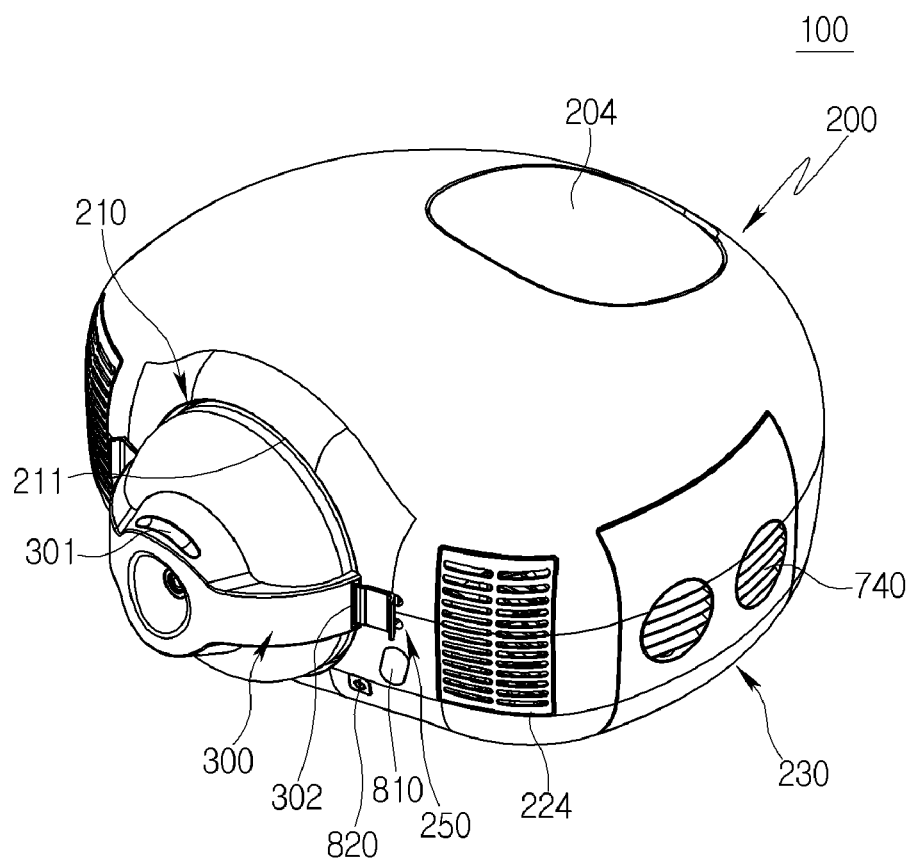

FUEL CELL POWER PACK

CROSS REFERENCE TO RELATED APPLICATIONS

This application is a National Stage of International Application No. PCT/KR2019/010863 filed Aug. 26, 2019, claiming priority based on Korean Patent Application No. 10-2018-0103813 filed Aug. 31, 2018.

TECHNICAL FIELD

Apparatuses and methods consistent with exemplary embodiments relate to a full cell power pack for supplying power.

DESCRIPTION OF THE RELATED ART

A drone is a generic term for unmanned aerial vehicle. The drone controlled by radio waves was initially used militarily for intercept practice of air force aircraft, anti-aircraft guns or missiles.

As wireless technology gradually developed, the drone is also used for military reconnaissance aircraft and destroying target facilities equipped with various weapons.

Recently, the use of drones is expanding. Small drones have been developed and used for leisure purposes. In addition, a delivery industry is planning and executing a delivery mechanism that uses drones to transport ordered goods.

In line with this trend, major global companies consider the drone-related industry to be a promising new business and are focusing on investment activities and technology development.

However, in the operation of a drone, one of the most important things is whether it can be operated for a long time. Most of the drones currently used in the market do not have long flight times. Drones operate by driving a plurality of propellers, and a lot of power is consumed to drive the propellers.

However, if a drone is equipped with a large-volume, high-capacity battery or a large number of batteries to increase flight time, the size and weight of the drone may increase due to the size and weight of the battery, resulting in inefficient results. In particular, for delivery-related drones, the payload value is also considered, so reducing the size and weight of the drone itself becomes one of the important factors in drone operation. Therefore, there is a limit to increasing the volume or number of batteries on the market for long-term operation.

In addition, if a large-volume, high-capacity battery or a large number of batteries is indiscriminately installed on the drone, the drone's mobility may decrease.

SUMMARY

Aspects of one or more exemplary embodiments provide a full cell power pack capable of reducing weight by supplying power from a fuel cell while enabling a long-term operation of a flying object such as a drone, maintaining an overall weight balance and achieving stable operation of the flying object, even if integrally mounted inside the drone, maintaining a stable operating environment temperature of a stack while contributing to the generation of lift force of the flying object by improving an air circulation structure, and enhancing the user's convenience by a gas supply structure that allows easy installation and removal of a gas tank.

Additional aspects will be set forth in part in the description which follows and, in part, will become apparent from the description, or may be learned by practice of the exemplary embodiments.

According to one aspect of an exemplary embodiment, there is provided a fuel cell power pack including: a case, a gas tank placed in a gas tank mounting and removing part formed in the case, and a fuel cell unit placed in the case in a weight balance with the gas tank.

The fuel cell unit may include a manifold part connected to a regulator valve coupled to the gas tank and a stack part connected to the manifold part to receive fuel gas.

The manifold part and the stack part may be arranged in a weight balance with respect to a second direction V2 of the case based on a center line P in a first direction V1 of the case.

The manifold part may be placed on an inner front portion of the case, and a plurality of the stack parts may be placed on positions symmetrical to each other on both inner sides of the case.

The gas tank and the stack part may be in weight balance with respect to a second direction V2 of the case based on a center line P in a first direction V1 of the case.

A plurality of the stack parts may be placed in the case.

The gas tank and the plurality of the stack parts may be in weight balance with respect to the second direction V2 of the case based on the center line P in the first direction V1 of the case.

The gas tank may be placed on the center line P in the first direction V1 of the case.

The plurality of the stack parts may be placed on positions symmetrical to each other on both sides of the case based on the gas tank.

The fuel cell power pack may further include an auxiliary power supply part configured to be disposed in the case and to be connected to the fuel cell unit in parallel to supply auxiliary power.

A plurality of the auxiliary power supply parts may be placed on positions symmetrical to each other based on a center line P in a first direction V1 of the case.

The plurality of the stack parts may be placed in the case, and the plurality of the stack parts and the plurality of the auxiliary power supply parts may be arranged in a weight balance with respect to a second direction V2 of the case based on the center line P of the first direction V1 of the case.

The fuel cell power pack may further include a discharge part formed on an inner lower portion of the case to collect and discharge condensed water discharged from the stack part or condensed water generated by condensing external air in the case.

The discharge part may include a drain tank having a recessed shape and formed in the inner lower portion of the case, a first drain pipe connected to a lower portion of the stack part and configured to be disposed in the drain tank to discharge the condensed water discharged from the stack part to an outside, and a second drain pipe placed in the drain tank to discharge the condensed water generated by condensing the external air in the case.

The discharge part may include a drain tank having a recessed shape and formed in the inner lower portion of the case, and a drain hole placed in the drain tank and including a gap hole to slowly discharge the condensed water collected in the drain tank.

The discharge part may further include a humidification unit placed in the drain tank to evaporate the condensed water collected in the drain tank to create a humidification environment in the case.

The humidification unit may be a heat coil, an ultrasonic humidification sensor, or a natural convection humidifier.

The gas tank mounting and removing part may include an insertion groove formed in a rear portion of the case to insert the gas tank, and a fixing member placed on circumference of the insertion groove to fix the gas tank.

The fixing member may include a fixing block fixed to an inner surface of the case and including a moving groove formed therein, a moving block including a protrusion inserted into the moving groove and connected to the fixing block, a fixing bar connected to the moving block by a link bar and mounted on and removed from the insertion groove of the gas tank, and a coil spring placed between the inner surface of the fixing block and an inner space of the protrusion.

The fixing member may further include a guide groove formed in the fixing block, and a guide protrusion placed in the moving block and inserted into the guide groove.

The fixing member further includes a fixing bolt placed in the fixing block, and a fixing groove placed in the moving block and into which an end of the fixing bolt is inserted.

Apparatuses consistent with exemplary embodiments relate to a power pack driven by a fuel cell that has superior output to weight compared to a related art battery applied to a flying object such as a drone, enable for long operation of the drone, and can increase the payload value of the drone.

In addition, a case can be designed in a streamlined manner so that the air resistance that may occur when a drone is maneuvered in various directions can be minimized.

In addition, a hydrogen tank insertion port in which a fixing member for fixing the hydrogen tank is placed can be placed on the rear side of the case, and a pressurized manifold block can be placed inside the front side of the case. Thus, when the hydrogen tank is inserted into the case, the regulator valve of the hydrogen tank can be firmly coupled to the manifold block in a pressurized state, thereby preventing leakage between the supplies of hydrogen gas. In the case of separating the hydrogen tank, a repulsive elastic force in a pressurized state can be generated in separating the fixing member, so that the hydrogen tank can be quickly separated from the hydrogen tank insertion port. Accordingly, it is possible to easily replace the hydrogen tank, and to allow the use of hydrogen containers of slightly different lengths.

In addition, it is possible to control the flow rate of hydrogen gas to be supplied to the stack by placing an electronically controlled flow control valve such as a solenoid valve on the manifold block, which can turn the fuel cell on/off at a desired timing by a user, and it is possible for the fuel cell to stop operating in an emergency situation.

In addition, by the user's simple operation of inserting the regulator valve connected to the hydrogen tank into the manifold block, the opening and closing bar placed inside the regulator valve can be pressed by the push part formed inside the manifold block, so that a structure where gas flow paths are in communication with each other can be formed and work convenience can be improved.

In addition, the gas supply pipe branching from the manifold block can be connected to the top of the stack, and when the condensate generated by the electrochemical reaction of hydrogen gas and air moves downwards by gravity, the inflow of the hydrogen to be supplied from the gas supply pipe to the stack cannot disturbed. Thus, the chemical reaction efficiency in the stack can be increased.

In addition, an auxiliary battery such as a lithium-ion battery can be placed and controlled to supply power in parallel with the fuel cell, thereby enabling stable power supply to the drone. In this case, in consideration of the weight balance, a plurality of auxiliary batteries can be placed in positions symmetrical to each other on both sides of the case with the hydrogen tank as a center, and even if one auxiliary battery fails, the remaining auxiliary batteries enable stable operation of the drone.

In addition, an air inlet can be placed on the front portion, the rear portion or the bottom portion of the case, an air outlet can be placed on both sides of the case, respectively, and a fan can be placed on the air outlet. Thus, as the fan is driven, the air introduced through the front portion, the rear portion or the bottom portion can pass through the stack. In this case, the inside of the case can be formed in a negative or lower pressure state compared to an outside, so that the supplying of air to be supplied to the stack can be smoothly performed. The controller for controlling the fuel cell can adjust the flow rate of air to be supplied to the stack by controlling the rotational speed of the fan motor, thereby enabling efficient operation of the fuel cell according to the operational environment and conditions.

In addition, the circuit board can be placed on the air inlet so that the circuit board heated during operation can be naturally cooled by external air, thereby improving the cooling effect of the circuit board.

In addition, a sealing housing can be provided between the stack and the air outlet and a recirculation flow path can be formed on the sealing housing, so that part of the air that has passed through the stack can be recirculated to the inside of the case through the recirculation flow path, thereby preventing sudden changes in operating environment temperature of the stack according to an outside temperature. In this case, by arranging a valve capable of electronic control on the recirculation flow path so that the amount of recirculated air can be controlled, the internal temperature of the case can maintain the optimized temperature of the fuel cell.

In addition, a plurality of blinds can be placed on the air outlet, and each blind can be arranged inclined in downward direction so that it can be relatively coincident with the air flow direction by the propeller of the drone. Accordingly, such configuration can contribute in generating the lift force of the drone and prevent rainwater or moisture from entering the system even in snowy and rainy environments.

In addition, a handle can be placed on the hydrogen tank to facilitate handling of the hydrogen tank, and a semi-transparent glass lid can be placed on the upper portion of the case to facilitate internal operation and easy identification during maintenance/repair, thereby improving user convenience.

BRIEF DESCRIPTION OF DRAWINGS

The above and/or other aspects and features will become more apparent from the following detailed description of the exemplary embodiments, taken in conjunction with the accompanying drawings, in which:

FIG. 1 is a plan view of a fuel cell power pack according to an exemplary embodiment;

FIG. 2 is a front view of a fuel cell power pack according to an exemplary embodiment;

FIG. 3 is a side view of a fuel cell power pack according to an exemplary embodiment;

FIG. 4 is a rear view of a fuel cell power pack according to an exemplary embodiment;

FIG. 5 is a bottom view of a fuel cell power pack according to an exemplary embodiment;

FIG. 6 is a perspective view of a fuel cell power pack according to an exemplary embodiment;

FIG. 7 is a perspective view illustrating an inside of a fuel cell power pack according to an exemplary embodiment;

FIG. 8 is a side perspective view illustrating an inside of a fuel cell power pack according to an exemplary embodiment;

FIG. 9 is a top view illustrating an inside of a fuel cell power pack according to an exemplary embodiment;

FIG. 10 is a plan view illustrating a structure of a fixing member according to an exemplary embodiment;

FIG. 11 is a side view illustrating a structure of a fixing member according to an exemplary embodiment;

FIG. 12 is a perspective view illustrating a structure of a fixing member according to an exemplary embodiment;

FIG. 13 is a cross-sectional view of E-E shown in FIG. 10;

FIG. 14a is a schematic cross-sectional view of a discharge part according to a first exemplary embodiment;

FIG. 14b is a schematic cross-sectional view of a discharge part according to a second exemplary embodiment;

FIG. 15a is a schematic cross-sectional view of a discharge part according to a third exemplary embodiment;

FIG. 15b is a schematic cross-sectional view of a discharge part according to a fourth exemplary embodiment;

FIG. 16 is a plan view illustrating an air circulation structure of a fuel cell power pack according to an exemplary embodiment;

FIG. 17 is a partial cross-sectional view of B-B shown in FIG. 2;

FIG. 18a is a partial cross-sectional view of A-A shown in FIG. 1;

FIG. 18b is an enlarged view of a portion M shown in FIG. 18a;

FIG. 19a is a partial cross-sectional view illustrating an air circulation structure of a fuel cell power pack according to another exemplary embodiment;

FIG. 19b is an enlarged view of a portion M shown in FIG. 19a;

FIG. 20a is a partial cross-sectional view illustrating an air circulation structure of a fuel cell power pack according to another exemplary embodiment FIG. 20b is an enlarged view of a portion L shown in FIG. 20a;

FIG. 21 is a plan view illustrating a gas supply structure of a fuel cell power pack according to an exemplary embodiment;

FIG. 22 is an enlarged view of a portion N shown in FIG. 21;

FIG. 23 is a perspective view of a pressurizing unit according to a first exemplary embodiment;

FIG. 24a is a perspective view of a pressurizing unit according to a second exemplary embodiment;

FIG. 24b is a perspective view of another pressurizing unit according to a second exemplary embodiment;

FIG. 25 is a cross-sectional view of a gas supply unit according to an exemplary embodiment;

FIG. 26 is an enlarged view of a portion H shown in FIG. 25

FIG. 27 is a cross-sectional view illustrating an arrangement structure of a flow control valve according to an exemplary embodiment;

FIG. 28 is a plan view of a fuel cell power pack according to another exemplary embodiment;

FIG. 29 is a front view of a fuel cell power pack according to another exemplary embodiment;

FIG. 30 is a side view of a fuel cell power pack according to another exemplary embodiment;

FIG. 31 is a rear view of a fuel cell power pack according to another exemplary embodiment;

FIG. 32 is a bottom view of a fuel cell power pack according to another exemplary embodiment; and FIG. 33 is a perspective view of a fuel cell power pack according to another exemplary embodiment.

DETAILED DESCRIPTION

Various modifications may be made to the embodiments of the disclosure, and there may be various types of embodiments. Thus, specific embodiments will be illustrated in the accompanying drawings and the embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

Hereinafter, exemplary embodiments of various structures of a fuel cell power pack will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a plan view of a fuel cell power pack 100 according to an exemplary embodiment, FIG. 2 is a front view of the fuel cell power pack 100 according to an exemplary embodiment, FIG. 3 is a side view of the fuel cell power pack 100 according to an exemplary embodiment, FIG. 4 is a rear view of the fuel cell power pack 100 according to an exemplary embodiment, FIG. 5 is a bottom view of the fuel cell power pack 100 according to an exemplary embodiment, FIG. 6 is a perspective view of the fuel cell power pack 100 according to an exemplary embodiment, FIG. 7 is a perspective view illustrating an inside of the fuel cell power pack 100 according to an exemplary embodiment, FIG. 8 is a side perspective view illustrating an inside of the fuel cell power pack 100 according to an exemplary embodiment, and FIG. 9 is a top view illustrating an inside of the fuel cell power pack 100 according to an exemplary embodiment.

Referring to FIGS. 1 to 9, a fuel cell power pack 100 may include a case 200, a gas tank 300 and a fuel cell unit 400. The fuel cell power pack 100 may be mounted on a flying object such as a drone to supply power. Also, it can be installed on various equipment to supply power.

The case 200 may be mounted on a drone and may have a streamlined appearance to minimize air resistance during flight. It can also be made lightweight by applying materials such as reinforced plastic, carbon, titanium and aluminum.

A lid 204 may be placed on the case 200 and a lid handle 205 may be formed on the lid 204. A user can hold the lid handle 205 and open the lid 204 to perform maintenance of various parts disposed inside the case 200.

In addition, an antenna hole 206 may be placed on one side of an upper portion of the case 200. The antenna hole 206 may be a portion protruding outward of an antenna that communicates with a wireless terminal of a user.

A gas tank mounting and removing part 210 may be placed on a rear portion 203 of the case 200. The gas tank mounting and removing part 210 may include an insertion port 211 corresponding to an external cross-section of the gas tank 300 and a fixing member 250 for fixing the gas tank 300.

Further, a tank handle 301 may be placed at a rear end of the gas tank 300 so that a user can easily handle the gas tank 300, and an insertion groove 302 into which the fixing member 250 may be mounted and removed may be disposed on a side portion of the gas tank 300. The gas charged in the gas tank 300 may be hydrogen gas. However, it is not limited thereto, and may be other fuel gas according to technological development.

FIG. 10 is a plan view illustrating a structure of a fixing member 250 according to an exemplary embodiment, FIG. 11 is a side view illustrating the structure of the fixing member 250 according to an exemplary embodiment, FIG. 12 is a perspective view illustrating the structure of the fixing member according to an exemplary embodiment, and FIG. 13 is a cross-sectional view of E-E shown in FIG. 10.

Referring to FIGS. 10 to 13, the fixing member 250 may include a fixing block 251, a fixing bar 260, a moving block 255, a coil spring 265, a guide groove 253, a guide protrusion 257, a fixing bolt 262 and a fixing groove 263.

The fixing block 251 may be bolt-fixed to an inner surface of the case 200 by a fixing bracket 267 adjacent to the insertion port 211. A moving groove 252 having a circular cross section in the direction of the insertion groove 302 of the gas tank 300 may be formed in the fixing block 251.

The moving block 255 may be provided with a guide link 256 having a cylindrical shape inserted into the moving groove 252. The guide link 256 may be inserted into the moving groove 252 to connect the moving block 255 and the fixing block 251 together so that the moving block 255 may be placed to be movable in the direction of the insertion groove 302.

The fixing bar 260 may be connected to the moving block 255 and a plurality of link bars 258, and may be inserted into or removed from the insertion groove 302 of the gas tank 300 as the moving block 255 moves.

The coil spring 265 may be placed between the inner surface of the fixing block 251 and the inner space of the guide link 256. The coil spring 265 may provide an elastic force to the guide link 256 to maintain the fixing bar 260 fitted in the insertion groove 302 of the gas tank 300.

The guide groove 253 may be formed in the fixing block 251 along the moving direction of the moving block 255. The moving block 255 includes a guide protrusion 257 placed in the guide groove 253, and the guide protrusion 257 may be inserted into the guide groove 253 and move, so that the moving direction of fixing bar 260 can be guided to the insertion groove 302.

Here, the fixing bolt 262 may be placed on the protrusion of the fixing block 251. In addition, the fixing groove 263 may be placed in the moving block 255, and may be a portion into which an end 262a of the fixing bolt 262 is inserted.

If a user pulls the fixing bar 260 in an opposite direction of the insertion groove 302 and turns the fixing bolt 262, the end 262a of the fixing bolt 262 can be inserted into the fixing groove 263. Thus, the position of the fixing bar 260 can be fixed without moving in the direction of the insertion groove 302 by the elastic force of the coil spring 265.

This enables a user to easily attach or detach the gas tank 300 without being interfered by the fixing bar 260 when the gas tank 300 is mounted or removed from the insertion port 211.

Referring back to FIGS. 1 to 9, a power switch 820 for operating the fuel cell unit 400 placed inside the case 200 may be placed on the rear portion 203 of the case 200. A user can simply click the power switch 820 to determine whether to operate the fuel cell power pack 100.

In addition, a fuel status display window 810 may be connected to the gas tank 300 and display the remaining amount of gas in the gas tank 300. For example, the user can check the remaining amount of gas with the color of the fuel status display window 810. The fuel status display window 810 may be in a form of an indicator LED, but is not limited thereto.

For example, blue or green may indicate that a remaining gas is 80-100% and it is a sufficient state. Yellow may indicate that a remaining gas is 40-70% and it is an intermediate state. Red may indicate that a remaining gas is 0-30% and it is an insufficient state for requiring gas filing. Other settings are possible.

A front window 221 may be placed on a front portion 201 of the case 200, and the front window 221 may be an air inlet 220 through which external air is introduced into the case 200. In this case, blinds arranged in a plurality of rows may be formed on the front window 221, and it is possible to prevent a relatively bulky foreign substance from flowing into the case 200.

FIG. 31 is a rear view of a fuel cell power pack according to another exemplary embodiment. Referring to FIG. 31, the air inlet 220 may be placed in a form of a rear window 224 on both sides of the gas tank 300 on the case 200 together with the front window 221. It is understood that the air inlet 220 may be placed on multiple locations of the case 200, and the locations of the air inlet 220 are not limited on the case 200.

Referring to FIGS. 1 to 9, an air outlet 230 having a plurality of blinds may be placed on a side portion 202 of the case 200, and the air introduced from the air inlet 220 may circulate inside the case 200 and then flow through the air outlet 230 to be discharged to the outside.

Here, the fuel cell unit 400 may be placed in a weight balance with the gas tank 300 inside the case 200. The fuel cell power pack 100 may be mounted on a flying object such as a drone to fly together. Thus, the case 200, the gas tank 300 and the fuel cell unit 400 can be placed in overall weight balance so as not to interfere with the drone's mobility.

The fuel cell unit 400 may include a manifold part 420 and a stack part 410. The manifold part 420 may be connected to a regulator valve 320 coupled to the gas tank 300. The stack part 410 may be connected to the manifold part 420 and may receive gas from the manifold part 420.

Referring to FIG. 9, based on a center line P in a first direction V1 of the case 200, the manifold part 420 and the stack part 410 may be arranged in weight balance with respect to a second direction V2 of the case 200.

For example, the manifold part 420 may be placed on the inner front portion 201 of the case 200, and a plurality of the stack parts 410 may be placed in symmetrical positions on both inner sides of the case 200.

When a plurality of stack parts 410 are placed, the gas tank 300 and the plurality of stack parts 410 may be placed to balance weight in the second direction V2 of the case 200, that is, on both sides of the case 200, based on the center line P in the first direction V1 of the case 200.

Here, the gas tank 300 may be placed on the center line P in the first direction V1 of the case 200, and the plurality of stack parts 410 may be placed in positions symmetrical to each other with respect to the gas tank 300 on both sides of the case 200.

That is, the gas tank 300 may be placed on the center of the case 200, and the stack part 410 may be composed of two as shown in FIG. 9, and are placed at the same position on both sides of the gas tank 300, respectively. Accordingly, the fuel cell power pack 100 can achieve a weight balance in the second direction V2 based on the center line P in the first direction V1.

When the fuel cell power pack 100 is mounted on a drone, an arrangement considering the weight balance can minimize fluctuations in the center of gravity of the drone, thereby reducing the influence on the operation of the drone.

An auxiliary power supply part 500 may be placed inside the case 200 to be connected in parallel with the fuel cell unit 400 to supply power to the drone.

That is, the fuel cell unit 400 and the auxiliary power supply part 500 may be connected in parallel in a control panel 830 to selectively supply power to the drone.

For example, electric power generated by a chemical reaction of oxygen and hydrogen in the stack part 410 of the fuel cell unit 400 may be supplied to the drone to operate the drone.

If an output higher than the output amount generated by the stack part 410 is required according to the flight and mission environment of the drone, the auxiliary power supply part 500 may supplement insufficient output in parallel.

In other case, for example, when an accidental situation such as stop of the power generation due to damage of the stack part 410 occurs, the auxiliary power supply part 500 may supply emergency power to prevent the drone from stopping during flight.

If a plurality of auxiliary power supply parts 500 are arranged, they may be placed in a position symmetrical to each other on the front portion 201 of the case 200 based on the center line P of the first direction V1 of the case 200, so as to balance weight and not to interfere with the maneuvering of a flying object.

For example, the auxiliary power supply part 500 may be configured in multiple units, and in this case, the stack part 410 of the fuel cell unit 400 may also be configured in multiple units. The plurality of stack parts 410 and the plurality of auxiliary power supply parts 500 may be arranged in a weight balance in positions symmetrical to each other in the case 200 with respect to the center line P in the first direction V1 of the case 200.

As illustrated in FIG. 9, the stack part 410 and the auxiliary power supply part 500 may be configured in two, and they may be placed on a position symmetrical to each other in the case 200 based on the center line P in the first direction V1 to achieve weight balance.

Meanwhile, the gas tank 300, the manifold part 420 and the control panel 830 may be placed on the center line P in the first direction V1. They may be arranged to balance weight between the front portion 201 of the case 200 and the rear portion 203 of the case 200 along the center line P in the first direction V1.

That is, the stack part 410 and the auxiliary power supply part 500 may be placed on a position symmetrical to each other in both sides of the center line P in the first direction V1 inside the case 200 to achieve a weight balance. The gas tank 300, the manifold part 420 and the control panel 830 may be placed on the center line P in the first direction V1 in the case 200, and they may have weight balance between the front portion 201 of the case 200 and the rear portion 203 of the case 200.

The stack part 410, the auxiliary power supply part 500, the gas tank 300, the manifold part 420 and the control panel 830 may be placed to have weight balance overall for both the first and second directions V1 and V2 inside the case 200. Thus, even if the fuel cell power pack 100 is mounted on the drone, the weight balance of the drone can also be maintained without being shifted to either side.

The weight balance arrangement of the above-described components can minimize the influence on the drone's maneuvering environment and contribute to the smooth maneuvering of the drone.

FIG. 14a is a schematic cross-sectional view of a discharge part 600 according to a first exemplary embodiment, and FIG. 14b is a schematic cross-sectional view of the discharge part 600 according to a second exemplary embodiment.

Referring to FIGS. 14a and 14b, the discharge part 600 may be formed in an inner lower portion of the case 200, and is configured to discharge condensate generated by condensing water discharged from the stack part 410 or external air collected in the case 200.

The discharge part 600 may include a drain tank 610, a first drain pipe 620 and a second drain pipe 630.

The drain tank 610 may be formed in a recessed shape on the inner lower portion of the case 200 to collect condensed water. Referring to FIGS. 2 and 5, two discharge parts 600 may be formed on both sides of the front portion 201 of the case 200 because the stack parts 410 are placed on both inner sides of the case 200.

The first drain pipe 620 may be connected to the lower portion of the stack part 410 and placed in the drain tank 610, and may be provided to discharge the condensed water discharged from the stack part 410 to the outside. The condensed water generated by the electrochemical reaction of oxygen and hydrogen in the stack part 410 may be discharged to the outside through the first drain pipe 620.

The second drain pipe 630 may be placed in the drain tank 610 and may be provided to discharge the condensed water generated by condensing the external air in the case 200 to the outside.

Referring again to FIGS. 14a and 14b, the discharge part 600 may further include a humidification unit 640 which may be placed in the drain tank 610 and create a humidification environment inside the case 200 by evaporating the condensed water collected in the drain tank 610.

In general, the electrochemical reaction between oxygen and hydrogen in a fuel cell stack is more promoted in humidified environment than in dry environment, thereby increasing power generation efficiency of the fuel cell.

Therefore, the humidification unit 640 may be placed in the drain tank 610 and create a humidification environment in which the electrochemical reaction can be accelerated in the stack part 410 by evaporating the collected condensed water again, thereby contributing to improving the power generation efficiency of the stack part 410.

As illustrated in FIG. 14a, the humidification unit 640 may be configured in the form of a heat coil. The heat coil may be placed on the drain tank 610, and the condensed water collected in the drain tank 610 can receive heat from the heat coil and evaporate to create humidification environment. In this case, the control panel 830 may control the heat coil, and the heat coil may receive power from the stack part 410 or the auxiliary power supply part 500.

Alternatively, as illustrated in FIG. 14b, the humidification unit 640 may be an ultrasonic humidification sensor. The ultrasonic humidification sensor may be placed on the drain tank 610, and the condensed water collected in the drain tank 610 can become steam by vibration generated by ultrasonic waves to create humidification environment inside the case 200. The control panel 830 may control the ultrasonic humidification sensor, and the ultrasonic humidification sensor may receive power from the stack part 410 or the auxiliary power supply part 500.

It is understood that these are only examples, and are not limited thereto and may also be implemented as other humidification unit 640 such as a natural convection humidifier.

FIG. 15a is a schematic cross-sectional view of the discharge part according to a third exemplary embodiment, and FIG. 15b is a schematic cross-sectional view of the discharge part according to a fourth exemplary embodiment.

Referring to FIGS. 15a and 15b, the discharge part 600 may include another type of drain hole 650. The humidification unit 640 may be placed in the drain tank 610, and a gap hole 653 may be formed in the drain hole 650. The condensed water collected in the drain tank 610 may be discharged to the outside through the gap hole 653, and the gap hole 653 may be formed in a cross-shaped gap, so that the condensed water cannot be discharged quickly at once, but discharged slowly by gravity as condensate forms in the gap hole 653. This is a design that is considered in order to secure a time for the humidification unit 640 to evaporate condensed water to create a humidification environment.

The drain hole 650 may be implemented with a hard material such as plastic or metal, while the drain hole 650 may be implemented with a soft material such as rubber or silicone. In this case, the structure can be changed such that a separate drain pipe is inserted to discharge condensed water.

FIG. 16 is a plan view illustrating an air circulation structure of the fuel cell power pack 100 according to an exemplary embodiment, FIG. 17 is a partial cross-sectional view of B-B shown in FIG. 2, FIG. 18a is a partial cross-sectional view of A-A shown in FIG. 1, and FIG. 18b is an enlarged view of a portion M shown in FIG. 18a.

Referring to FIGS. 16 to 18b, the air circulation structure of the fuel cell power pack 100 may include the air inlet 220, the air outlet 230 and a flow guide unit 700. The air inlet 220, the air outlet 230 and the flow guide unit 700 may be placed in the case 200 of the fuel cell power pack 100.

The air inlet 220 may be placed under the front portion 201 of the case 200 and may be a component through which external air is introduced. Here, the front window 221 having multiple blinds placed on the front portion 201 of the case 200 may be the air inlet 220. However, the location of the air inlet 220 is not limited thereto.

In this case, the control panel 830 may be placed on the upper side of the air inlet 220 in the case 200 and may be cooled by the air introduced from the air inlet 220. That is, when the fuel cell is operated, the circuit placed in the control panel 830 can be heated, and at this time, it can be cooled by the flow of air introduced from the outside.

The air outlet 230 may be placed in the case 200 to be spaced apart from the air inlet 220 and may be a component through which the air introduced into the case 200 is discharged. In this case, the air outlet 230 may be placed adjacent to the stack part 410.

Here, the gas tank 300 may be placed at the center side of the case 200, and the stack part 410 may be placed at both sides of the gas tank 300. Accordingly, the air outlet 230 may be placed on the side portion 202 of the case 200 while being adjacent to the stack part 410.

Accordingly, the air introduced from the air inlet 220 can pass through the stack part 410 and may be guided by the flow guide unit 700 to be discharged to the air outlet 230.

The flow guide unit 700 may be arranged in connection with the stack part 410 and the air outlet 230 to guide the air flow in the case 200.

The flow guide unit 700 may include a sealing housing 710, a fan member 730, a recirculation flow path 720 and a blind 740.

The sealing housing 710 may be arranged to seal a circumference of one surface of the stack part 410 and the inner side portion 202 of the case 200 that is an outer circumference periphery of the air outlet 230 so that the air passing through the stack part 410 can flow in the direction of the air outlet 230.

In this case, the sealing housing 710 may be configured in multiple plates, and may be arranged to form a sealed space that surrounds in all directions the circumference of one surface of the stack part 410 and the inner side portion 202 of the case 200.

Due to the sealed space, the air passing through the stack part 410 can flow only in the direction of the air outlet 230.

The fan member 730 may be placed in the air outlet 230. When the fan member 730 operates, the air in the case 200 can be released to the outside, so that the inside of the case 200 can be formed in a relatively lower pressure state or a negative pressure state compared to an external environment.

When the inside of the case 200 becomes relatively lower or negative pressure, external air can be introduced into the case 200 through the air inlet 220 due to a pressure difference. That is, an air circulation environment can be created forcibly by operating the fan member 730.

Here, the fan member 730 may be placed in the space formed by the air outlet 230, the sealing housing 710 and the stack part 410, so that the air discharged by the operation of the fan member 730 can adjust the air flow environment such that the air introduced through the air inlet 220 is forcibly passed through the stack part 410.

A user can control a rotational speed of the fan member 730 with a controller to control the amount of air introduced into the case 200 by the pressure difference. This can ultimately adjust the amount of air supplied to the stack part 410, which may be a means for controlling the output of the stack part 410.

The fan member 730 may include a fan bush 731, a driving motor 733 and a fan blade 735. The fan bush 731 may be provided in a cylindrical shape, and may be placed in the air outlet 230. The driving motor 733 may be placed at a central portion of the fan bush 731. The fan blade 735 may be connected to a rotation shaft of the driving motor 733.

Meanwhile, in order for the fuel cell to operate stably while maintaining high efficiency, the operating environment of the fuel cell stack needs to be optimally maintained. In particular, the operating environment temperature can be an important factor, and the operating environment temperature of the fuel cell stack can be affected by the external environment temperature in which the drone is operated.

For example, when a drone is maneuvered in a cold region such as Siberia, Arctic, Antarctic, etc., a temperature difference is severely generated between the outside and the inside of the case 200, and the internal temperature of the case 200 is affected and decreased due to the outside temperature.

That is, the operating environment temperature of the stack part 410 placed in the case 200 may not be maintained at an appropriate temperature. In this case, it is necessary to raise the internal temperature of the case 200 to the appropriate temperature.

Conversely, when a drone is maneuvered in a hot region such as Africa, the Middle East, the desert, etc., a temperature difference is severely generated between the outside and the inside of the case 200, and the inside temperature of the case 200 is affected and heated due to the outside temperature.

That is, the operating environment temperature of the stack part 410 placed in the case 200 may not be maintained at an appropriate temperature. In this case, it is necessary to lower the internal temperature of the case 200 to the appropriate temperature.

Therefore, in order to prevent the operating environment temperature of the stack part 410 from rapidly changing due to the external environment temperature at which the drone is operated, as shown in FIGS. 16 and 18a, the recirculation flow path 720 may be placed on the sealing housing 710.

After passing through the stack part 410, some of the air remaining in the sealing housing 710 can pass through the recirculation flow path 720 and be diverted to the inside of the case 200 to be recycled.

The air passing through the stack part 410 may be the air after cooling the stack part 410, which is an air-cooled type, and maintain a temperature relatively similar to that of the stack part 410. Thus, when some of the air remaining in the sealing housing 710 is recycled in the case 200, the internal temperature of the case 200 may be adjusted to be similar to the operating environment temperature of the stack part 410.

This can raise the internal temperature of the case 200 to the operating environment temperature of the stack part 410 when the drone is maneuvered in the cold area, and when the drone is maneuvered in the hot area, the internal temperature of the case 200 may be lowered to the operating environment temperature of the stack part 410.

That is, by adjusting the internal temperature of the case 200 to the operating environment temperature of the stack part 410, the operating efficiency of the stack part 410 can be increased.

The flow guide unit 700 may further include a recirculation control mechanism 722. The recirculation control mechanism 722 may be placed in the recirculation flow path 720 to control a flow rate of recirculated air.

The recirculation control mechanism 722 may be a slide type on/off valve or a butterfly type on/off valve by way of electronic control, but is not limited thereto.

A user may control a degree of opening and closing of the recirculation control mechanism 722 using a controller.

If an outside temperature is similar to the operating environment temperature of the stack part 410 and a separate internal temperature control of the case 200 is not required, a user can close the recirculation control mechanism 722 and all the remaining air inside the sealing housing 710 may be discharged to the outside through the air outlet 230.

In this case, the blind 740 may be placed to be inclined downward to contribute to the generation of lift force of the flying object when all the air in the sealing housing 710 is discharged to the air outlet 230.

If the difference between the outside temperature and the operating environment temperature of the stack part 410 is large, and it is necessary to quickly adjust the internal temperature of the case 200 to the operating environment temperature of the stack part 410, a user can use the controller and completely open the recirculation control mechanism 722.

In this case, because a large amount of air is guided from the sealing housing 710 to the case 200, the internal temperature of the case 200 can be quickly adjusted to the operating environment temperature of the stack part 410.

Referring to FIG. 18b, the blind 740 may be placed at the air outlet 230 to guide the flow direction of the discharged air. Here, the blind 740 may be placed inclined downward so that the air discharged from the air outlet 230 flows downward.

The fuel cell power pack 100 may be placed above or under the drone. In the case of a propeller-driven drone in which the drone is lifted by the generation of lift force by the rotation of the propeller, if an inclination direction of the blind 740 is set downward, the flow direction of the air discharging from the air outlet 230 and flowing downward and the flow direction of the external air passing through the propeller T of the drone and flowing downward can be coincident, which can contribute to the generation of the lift force of the drone.

Here, in order for the air passing through the blind 740 to contribute to the generation of the lift force of the propeller-driven drone, an inclination angle θ1 of the blind 740 may be in a range of 10° to 80° downward based on a horizontal line, preferably around 60°.

Here, a plurality of the blinds 740 may be placed on the air outlet 230, and a length of the plurality of blinds 740 may be reduced from an upper side to a lower side of the air outlet 230.

The air outlet 230 can be formed to be inclined toward the inside of the case 200 along from the upper side to the lower side of the case 200.

In this case, the length of the blind 740 can also be formed to be reduced from the upper side to the lower side of the air outlet 230, so that the discharging air can also flow downward.

Here, the length of the blind 740 may be reduced by a certain ratio, which may correspond to a ratio angle θ2 that decreases as the air outlet 230 moves from the upper side to the lower side.

As the length of the blinds 740 is reduced by the certain ratio, the air passing through the blinds 740 arranged in a plurality of rows may exhibit a relatively uniform flow.

Because the air flows downward, a length of a lower blind 742 placed on a lower portion is shorter than a length of an upper blind 741 placed on an upper portion, so that the downward flow may not be disturbed.

If the length reduction of the blinds 740 is not constant but different, for example, one lower blind 742 has a length longer than that of the upper blind 741 placed thereon, the lower blind 742 placed under the upper blind 741 may act as an obstacle to the air that passes through the upper blind 741 and flows downward. In addition, this may be mixed with the air discharged along the lower blind 742, and turbulent flow may occur in a periphery of the air outlet 230. Thus, this may prevent air from being discharged smoothly, and may rather hinder the drone's maneuvering.

Therefore, it may be desirable to maintain the length reduction of the blind 740 at a constant rate for smooth downward discharging of air and to create a maneuvering environment for the drone, such as the generation of lift force.

Thus, the downward inclination angle θ1 of the blind 740 and the length change according to the predetermined ratio angle θ2 of the blind 740 can make the outflowing air strongly discharged downward. This dual configuration can contribute to the drone's maneuvering environment, such as the generation of lift force.

Referring to FIG. 16, when a user operates the fan member 730, the air inside the case 200 can escape through the air outlet 230, so that the inside of the case 200 can become in a relatively lower or negative pressure state compared to the outside.

Accordingly, external air can be introduced through the front window 221 placed on the front portion 201 of the case 200 due to a pressure difference, and the introduced air can cool the control panel 830 placed on inner upper side of the front portion 201 of the case 200, and circulate and flow into the case 200.

The air circulating inside the case 200 can pass through one surface of the stack part 410 and react with hydrogen in the stack part 410 to generate electric power by the electrochemical reaction. Alternatively, it can air-cool the stack part 410 and flow toward the sealing housing 710.

The air flowing through the sealing housing 710 may pass through the fan member 730 and may be discharged to the outside through the air outlet 230.

In one exemplary embodiment, in order to maintain the operating environment temperature of the stack part 410 at an appropriate temperature according to an external environment temperature, a user may set the degree of opening and closing of the recirculation control mechanism 722 by a controller to control the air flow rate to be circulated inside the case 200 through the recirculation flow path 720.

Some of the air passing through the recirculation flow path 720 can circulate inside the case 200 again, so that a temperature relatively similar to the operating environment temperature of the stack part 410 can be maintained.

This can contribute to enhancing the output efficiency of the stack part 410 by properly maintaining the operating environment temperature and humidification condition of the stack part 410, together with the humidification unit 640 described above.

Hereinafter, the air circulation structure of the fuel cell power pack according to another exemplary embodiments will be described with reference to FIGS. 19a, 19b, 20a and 20b.

FIG. 19a is a partial cross-sectional view illustrating the air circulation structure of the fuel cell power pack according to another exemplary embodiment, FIG. 19b is an enlarged view of a portion M shown in FIG. 19a, FIG. 20a is a partial cross-sectional view illustrating the air circulation structure of the fuel cell power pack according to another exemplary embodiment, and FIG. 20b is an enlarged view of a portion L shown in FIG. 20a.

Referring to FIGS. 19a and 19b, the air circulation structure of the fuel cell power pack 100 may include the air inlet 220, the air outlet 230 and the flow guide unit 700. The air inlet 220, the air outlet 230 and the flow guide unit 700 may be placed in the case 200 of the fuel cell power pack 100.

Here, a module frame 900 may be placed inside the case 200. The module frame 900 may be a separate component mounted inside the case 200 or may be a part of the case 200.

On a center portion of the module frame 900, a tank receiving part 910 in which the gas tank 300 is placed may be formed. In addition, a stack receiving part 920 in which a plurality of the stack parts 410 are placed may be formed on both sides of the module frame 900. Accordingly, the air outlet 230 may be placed on the side portion 202 of the case 200 while being adjacent to the stack part 410.

The stack part 410 may be placed inclined and fixed to first and second receiving surfaces 921 and 923 of the stack receiving part 920 by first and second fastening units 922 and 924, respectively.

In the flow process, the air flow can be introduced from the air inlet 220, pass through the stack part 410, be guided by the flow guide unit 700 and be discharged to the air outlet 230.

The flow guide unit 700 may be placed in connection with the stack part 410 and the air outlet 230 to control the flow of the air that passes through the stack part 410 in the case 200 and flows in the direction of the air outlet 230.

The flow guide unit 700 may include the sealing housing 710, the fan member 730, the recirculation flow path 720 and the blind 740.

The sealing housing 710 may be placed to seal around the circumference of one surface of the stack part 410 and the outer circumference of a duct 760 placed on the air outlet 230, so that the air passing through the stack part 410 can flow in the direction of the air outlet 230.

In this case, the sealing housing 710 may be configured in multiple plates. One plate may surround one surface of the stack part 410 and another plate may be connected to the outer circumference of the duct 760 to form a sealed space.

Due to the sealed space, the air passing through the stack part 410 can flow only in the direction of the duct 760 of the air outlet 230.

Here, a fixing panel 713 for connecting and fixing the side surface of the case 200 and the sealing housing 710 may be placed so that the position of the sealing housing 710 can be fixed in the case 200.

The fixing panel 713 may have an opening window 713a having a square cross-sectional shape and connecting one surface of the stack part 410 and one surface of the sealing housing 710. In addition, a sealing unit 714 may be placed along a circumference of the opening window 713a in a direction facing the stack part 410.

The sealing unit 714 may be in close contact with the circumference of one surface of the stack part 410 and allow the air passing through the stack part 410 to flow in the direction of the sealing housing 710 without leakage.

The fan member 730 may be connected and placed to the duct 760 of the air outlet 230. When the fan member 730 operates, the air in the case 200 can be discharged to the outside through the air outlet 230, so that the inside of the case 200 can be relatively negative pressure or lower pressure compared to an outer environment.

When the inside of the case 200 becomes negative or lower pressure, an external air can be introduced into the case 200 through the air inlet 220 due to a pressure difference. That is, an air circulation environment can be forcibly created in the case 200 by operating the fan member 730.

Here, the fan member 730 may be placed in a space formed by the duct 760 of the air outlet 230, the sealing housing 710 and the stack part 410, so that the air discharge by the operation of the fan member 730 can adjust the air flow environment that forces the air introduced into the air inlet 220 to pass through the stack part 410

A user can control the rotational speed of the fan member 730 with a controller to control the amount of air introduced into the case 200 by use of the pressure difference. This can ultimately adjust the amount of the air supplied to the stack part 410, which may be a means of controlling the output of the stack part 410.

The fan member 730 may include a fan bush 731, a driving motor 733 and a fan blade 735. The fan bush 731 may have a cylindrical shape, and may be connected and placed around the inner circumference of the duct 760 of the air outlet 230. The driving motor 733 may be placed on a central portion of the fan bush 731. In addition, the fan blade 735 may be connected to the rotation shaft of the driving motor 733.

Meanwhile, in order for the fuel cell to operate stably while maintaining high efficiency, the operating environment of the fuel cell stack needs to be optimally maintained.

In particular, the operating environment temperature may be an important factor, and the operating environment temperature of the fuel cell stack may be affected by an external environment temperature in which the drone is operated.

For example, when a drone is maneuvered in a cold region such as Siberia, Arctic, Antarctic, etc., a temperature difference is severely generated between the outside and the inside of the case 200, and the internal temperature of the case 200 is affected and decreased due to the outside temperature.

That is, the operating environment temperature of the stack part 410 placed in the case 200 may not be maintained at an appropriate temperature. In this case, it is necessary to raise the internal temperature of the case 200 to the appropriate temperature.

Conversely, when a drone is maneuvered in a hot region such as Africa, the Middle East, the desert, etc., a temperature difference is severely generated between the outside and the inside of the case 200, and the inside temperature of the case 200 is affected and heated by the outside temperature.

That is, the operating environment temperature of the stack part 410 placed in the case 200 may not be maintained at an appropriate temperature. In this case, it is necessary to lower the internal temperature of the case 200 to the appropriate temperature.

Therefore, in order to prevent the operating environment temperature of the stack part 410 from rapidly changing due to the external environment temperature at which the drone is operated, a recirculation flow path 720 may be placed on the sealing housing 710.

After passing through the stack part 410, some of the air remaining in the sealing housing 710 can pass through the recirculation flow path 720, be diverted to the inside of the case 200 and be recycled.

The air passing through the stack part 410 is the air after cooling the stack part 410, which is an air-cooled type, and maintains a temperature relatively similar to that of the stack part 410. Thus, if a part of the air remaining on the sealing housing 710 is recycled in the case 200, the internal temperature of the case 200 may be adjusted to be similar to the operating environment temperature of the stack part 410.

This can raise the internal temperature of the case 200 to the operating environment temperature of the stack part 410 when the drone is maneuvered in the cold area, and this can lower the internal temperature of the case 200 to the operating environment temperature of the stack part 410 when the drone is maneuvered in the hot area.

That is, by adjusting the internal temperature of the case 200 to the operating environment temperature of the stack part 410, the operating efficiency of the stack part 410 can be improved.

The flow guide unit 700 may further include a recirculation control mechanism 722. The recirculation control mechanism 722 may be placed in the recirculation flow path 720 to control a flow rate of recirculated air.

The recirculation control mechanism 722 may be a slide type on/off valve or a butterfly type on/off valve using electronic control, but is not limited thereto.

A user may control the degree of opening and closing of the recirculation control mechanism 722 using a controller.

If an outside temperature is similar to the operating environment temperature of the stack part 410 and separate internal temperature control of the case 200 is not required, a user can close the recirculation control mechanism 722, and discharge all the remaining airs in the sealing housing 710 to the outside through the air outlet 230.

In this case, the blind 740 may be arranged to be inclined or curved downward, so that the lift force of a flying object can be generated when all the air in the sealing housing 710 is discharged to the air outlet 230.

If the difference between the outside temperature and the operating environment temperature of the stack part 410 is large, and it is necessary to quickly adjust the internal temperature of the case 200 to the operating environment temperature of the stack part 410, the user may use a controller to completely open the recirculation control mechanism 722.

In this case, because a large amount of air is guided from the sealing housing 710 to the case 200, the internal temperature of the case 200 can be quickly adjusted to the operating environment temperature of the stack part 410.

The blind 740 may be placed in the duct 760 of the air outlet 230 to guide the flow direction of the discharging air.

The air circulation structure of the fuel cell power pack 100 according to the exemplary embodiment may be designed to contribute the generation of the lift force of a drone when the air introduced from the air inlet 220 circulates in the case 200 and then is discharged to the air outlet 230.

The stack part 410 may be placed inclined downward within a range of a predetermined angle $\alpha1$ on the stack receiving part 920 of the module frame 900.

In addition, the sealing housing 710 may be connected and placed inclined downward within a range of a predetermined angle $\alpha2$ on one surface of the stack part 410.

The fan member 730 may be placed inclined downward within a range of a predetermined angle $\alpha3$ on the air outlet 230.

In addition, the blind 740 may be placed to be inclined or curved downward so that the air discharged from the air outlet 230 can flow downward.

For example, the stack receiving part 920 of the module frame 900 may be provided to be inclined downward within a range of a predetermined angle $\alpha1$ with respect to the vertical direction H1, and the stack part 410 may be placed inclined to the stack receiving part 920.

In the case, the inclination angle $\alpha1$ of the stack part 410 may be in a range of 5° to 15°, for example, around the range of 5°.

As the stack part 410 is placed in an inclined manner, the air passing through the stack part 410 and flowing into the sealing housing 710 can be induced to flow downward.

Meanwhile, the opening window 713a of the fixing panel 713 may be in close contact with one surface of the stack part 410 by the sealing unit 714. Here, the stack part 410 may be placed to be inclined downward to the stack receiving part 920, so that the fixing panel 713 can also be placed downward at the inclination angle $\alpha2$ corresponding to the stack part 410.

In the case, because the sealing housing 710 is connected along the circumference of the opening window 713a of the fixing panel 713, it can be arranged to be inclined downward at an angle corresponding to the inclination angle of the stack part 410. Thus, the range of the inclination angle $\alpha2$ of the sealing housing 710 may be the same as that of the stack part 410, i.e., within the range of 5° to 15°, and preferably around the range of 5°.

However, it is understood that the sealing housing 710 may be connected to one surface of the stack part 410 and placed more inclined in downward direction within a certain angle range.

In this case, the range of the inclination angle $\alpha2$ of the sealing housing 710 may be larger than the range of the inclination angle of the stack part 410. For example, the arrangement inclination angle of the sealing housing 710 to one surface of the fixing panel 713 may be more inclined within the range of 10° to 20° than the inclination range to the stack part 410.

The air outlet 230 may also be placed to face downward on the side portion of the case 200. Accordingly, the fan member 730 may be placed to face downward in the same manner as the air outlet 230.

Here, because the fan member 730 may be connected to the sealing housing 710, it may be placed to be inclined downward at an angle corresponding to the arrangement inclination angle α2 of the sealing housing 710. In this case, the range of the inclination angle α3 of the fan member 730 may be within the range of 5° to 15°, and preferably around the range of 5°, the same as the sealing housing 710°.

In another exemplary embodiment, the arrangement inclination angle α3 of the fan member 730 may be larger than the arrangement inclination angle α2 of the sealing housing 710. For example, if the arrangement inclination angle α2 of the sealing housing 710 is within the range of 5° to 15°, the inclination angle α3 of the fan member 730 may be in the range of 10° to 25°.

Alternatively, the arrangement inclination angle α3 of the fan member 730 may be larger than the arrangement inclination angles α1 and α2 of the stack part 410 and the sealing housing 710. For example, the arrangement inclination angle α1 of the stack part 410 is within the range of 5° to 15° and the inclination angle α2 of the sealing housing 710 that is more inclined than the stack part 410 is within the range of 10° to 20°, the inclination angle α3 of the fan member 730 may be within the range of 15° to 30°.

As described above, when the arrangement inclination angle α3 of the fan member 730 is larger than the arrangement inclination angles α1 and α2 of the stack part 410 and the sealing housing 710, the air passing through the stack part 410, the sealing housing 710 and the fan member 730 and flowing in the direction of the air outlet 230 can be smoothly guided downward.

That is, according to the direction of air flow, the inclination angles of the stacking portion 410, the sealing housing 710 and the fan member 730 arranged inclined may be gradually increased, so that air can flow smoothly in the downward direction.

Meanwhile, the blind 740 may be placed inclined or curved in a downward direction on the air outlet 230.

In the drone equipped with the fuel cell power pack 100, the propeller 213 may be placed on upper portion of the air outlet 230. In the case of the propeller 213 driven drone in which the drone is lifted by the generation of lift force by the rotation of the propeller 213, if the inclined direction or the curvature direction of the blind 740 is set to the downward direction, the flow direction of the air discharged from the air outlet 230 and flowing in downward direction and the flow direction of the external air flowing downward through the propeller 213 of the drone can coincide, thereby contributing to the generation of the lift force of the drone.

Here, in order for the air passing through the blind 740 to contribute to the generation of the lift force of the propeller 213 driven drone, the inclination angles θ11 and θ12 of the blind 740 may be in a range of 5° to 80° in the downward direction based on the horizontal direction H2. For example, the inclination angle θ11 may be in a range of 5° to 45°, and the inclination angle θ12 may be in a range of 30° to 80°. Preferably, the inclination angle θ11 may be around 30°, and the inclination angle θ12 may be around 60°.

Referring to FIG. 19b, the stack part 410, the sealing housing 710 and the fan member 730 may have an arrangement inclination angle in a range of 5° to 15°, and preferably around 5°, when described in relation to the arrangement inclination angles α1, α2 and α3 of the stack part 410, the sealing housing 710, and the fan member 730.

As discussed above, the arrangement inclination angles α1, α2 and α3 of the stack part 410, the sealing housing 710 and the fan member 730 can be gradually more inclined according to the air flow direction.

Accordingly, because the air passing through the stack part 410 and flowing in the direction of the blind 740 may be gradually induced to flow downward, the discharging flow of air may smoothly proceed in the direction for contributing to the generation of the lift force.

Here, a plurality of blinds 740 may be placed on the duct 760 of the air outlet 230, and lengths of the blinds 740 may be reduced as the blinds are arranged from upper side to lower side of the air outlet 230.

Here, the air outlet 230 is formed to be inclined or curved toward the inside of the case 200 from the upper side to lower side on the case 200.

In this case, the length of the blind 740 may also be formed to be reduced from the upper side to the lower side of the air outlet 230, so that the discharged air can also flow in downward direction.

Here, the length of the blind 740 can be reduced by a certain ratio, which may correspond to a ratio angle θ2 that decreases from the upper side to lower side of the air outlet 230.

As the length of the blinds 740 is reduced by the certain ratio, the air passing through the blinds 740 arranged in a plurality of rows may exhibit a relatively uniform flow.

Because the air flows downward and the length of the lower blind 742 placed at the lower portion is shorter than the upper blind 741 placed at the upper portion, the downward flow cannot be disturbed.

If the length reduction of the blinds 740 is not constant and is different from each other, one lower blind 742 has a longer length than that of the upper blind 741 placed thereon, the lower blind 742 placed under the upper blind 741 may act as an obstacle to the downward flow of the air passed through the upper blind 741, which may be mixed with the air discharged along the lower blind 742. Accordingly, turbulent flow may occur in the periphery of the air outlet 230. This may prevent air from being discharged smoothly, and may rather hinder the drone's maneuvering.

Therefore, it may be desirable to maintain the length reduction of the blind 740 at a constant rate for smooth downward discharge of air and to create a maneuvering environment for the drone, such as the generation of lift force.

That is, as the downward inclination angles θ11 and θ12 of the blind 740 and the length change of the blind 740 according to the predetermined ratio angle θ2 may work together, the discharging air may be strongly discharged downward. This dual configuration can contribute to the drone's maneuvering environment, such as the generation of lift force.

Referring to FIGS. 20a and 20b, in the air circulation structure of the fuel cell power pack 100 according to another exemplary embodiment, the blind 740 may be placed to be inclined downward on the air outlet 230.

In the drone equipped with the fuel cell power pack 100, the propeller 213 may be placed above the air outlet 230. Thus, as the inclined direction of the blind 740 is set downward, the flow directions of the air discharged from the air outlet 230 and flowing downward and the external air passing through the propeller 213 of the drone and flowing downward can coincide, which can also contribute to the generation of the lift force of the drone.

Here, in order for the air passing through the blind 740 to contribute to the generation of the lift force of the propeller 213 driven drone, the inclination angle θ3 of the blind 740 may be formed between 5° and 80° in the downward direction based on the horizontal direction H2, preferably around 60°.

Referring to FIG. 20b, when described in connection with the arrangement inclination angles α1, α2 and α3 of the stack part 410, the sealing housing 710 and the fan member 730, the arrangement inclination angles of the stack part 410, the sealing housing 710 and the fan member 730 may be in the range of 5° to 15°, and preferably around 5°.

As discussed above, in other exemplary embodiments, the stack part 410, the sealing housing 710 and the fan member 730 can be arranged gradually more inclined within the arrangement inclination angles α1, α2 and α3, according to the air flow direction.

Accordingly, the air passing through the stack part 410 and flowing in the direction of the blind 740 can be gradually induced to flow downward. Thus, the discharge flow of the air can smoothly proceed in the direction for contributing to generation of the lift force.

FIG. 21 is a plan view illustrating the gas supply structure of the fuel cell power pack 100 according to an exemplary embodiment, FIG. 22 is an enlarged view of a portion N shown in FIG. 21, FIG. 23 is a perspective view of a pressurizing unit 480 according to a first exemplary embodiment, FIG. 24a is a perspective view of the pressurizing unit 480 according to a second exemplary embodiment, FIG. 24b is a perspective view of another pressurizing unit according to a second exemplary embodiment, FIG. 25 is a cross-sectional view of the gas supply unit 430 according to an exemplary embodiment, FIG. 26 is an enlarged view of a portion H shown in FIG. 25, and FIG. 27 is a cross-sectional view illustrating the arrangement structure of the flow control valve 490 according to an exemplary embodiment.

Referring to FIGS. 21 to 27, a gas supply structure of the fuel cell power pack 100 may include a gas supply unit 430 and a pressurizing unit 480

The gas supply unit 430 may be connected to the regulator valve 320 of the gas tank 300 to be inserted into the case 200. The gas supply unit 430 may be placed on the front portion 201 of the case 200 to supply gas to the stack part 410 placed in the case 200.

The pressurizing unit 480 may be configured to have one side fixed to the inside of the front portion 201 of the case 200 and the other side connected to the gas supply unit 430 to pressurize the gas supply unit 430 in the direction of the regulator valve 320.

The pressurizing unit 480 may include a first plate 481, a second plate 483, a pressurizing elastic body 487 and a guide shaft 488.

The first plate 481 may be fixed in the front portion 201 of the case 200, and the second plate 483 may be connected to the gas supply unit 430.

Materials such as reinforced plastic, carbon, titanium, aluminum, etc. may be applied to the first plate 481 and the second plate 483 for light weight.

In addition, a cutting groove 485 of honeycomb shape may be formed in the first plate 481 or the second plate 483 for light weight.

The pressurizing elastic body 487 may be placed between the first plate 481 and the second plate 483. The guide shaft 488 may be fixed to the first plate 481 and connected through a hole of the second plate 483 to support the movement of the second plate 483. A beam bush 486 may be placed in the hole of the second plate 483 to smooth the flow of the guide shaft 488.

The guide shaft 488 may be made of a metal material, for example, a lubricant may be applied on the beam bushing 486 for smooth operation of the guide shaft 488.

Referring to FIGS. 23, 25 and 26, in the pressurizing unit 480 according to the first exemplary embodiment, a first protrusion 482 may be formed on the first plate 481, a second protrusion 484 may be formed on the second plate 483, and the pressurizing elastic body 487 may be interposed between the first protrusion 482 and the second protrusion 484. In this case, only one pressurizing elastic body 487 may be placed between the first plate 481 and the second plate 483.

Referring to FIG. 24a, in the pressurizing unit 480 according to the second exemplary embodiment, the pressurizing elastic body 487 may be placed on the guide shaft 488 between the first plate 481 and the second plate 483. Here, the first plate 481 and the second plate 483 may have a triangular shape, and accordingly, the pressurizing elastic bodies 487 may be placed on three guide shafts 488 placed on respective corners of the first plate 481 and the second plate 483, respectively.

Referring to FIG. 24b, in the pressurizing unit 480 according to another example of the second exemplary embodiment, the first and second plates 481 and 483 may have a square shape in consideration of weight balance. In addition, the pressurizing elastic bodies 487 may be placed on four guide shafts 488 placed at respective corners of the first plate 481 and the second plate 483, respectively. In this case, the pressurization force can be further improved.

Further, a stopper 489 may be placed at an end of the guide shaft 488 so that the second plate 483 does not separate from the guide shaft 488. When the regulator valve 320 of the gas tank 300 is separated from the gas supply unit 430, the second plate 483 can be pushed out by the elastic force of the pressurizing elastic body 487, but it can be caught by the stopper 489, so that the escape of the second plate 483 can be prevented.

Referring to FIG. 22, the first plate 481 and the second plate 483 may be formed in a polygonal plate shape, and multiple guide shafts 488 may be placed on respective corners of the first plate 481 and the second plate 483, so that the center of gravity may be positioned on the center line P in the first direction V1 of the case 200.

In the exemplary embodiments, the stack part 410, the gas tank 300 and the auxiliary power supply part 500 can be arranged in a weight balance with respect to the center line P in the first direction V1.

Therefore, the pressurizing unit 480 can also be configured so that both sides are symmetrical with respect to the center line P in the first direction V1, and be preferably arranged to balance the weight of the fuel cell power pack 100.

In detail, the first plate 481 and the second plate 483 may be formed in a symmetrical shape on both sides with respect to the center line P in the first direction V1 of the case 200, and the guide shaft 488 may be arranged in a number corresponding thereto.

In one exemplary embodiment, the first plate 481 and the second plate 483 may be formed in a triangular plate shape, and three guide shaft 488 may be placed on respective corners of the first plate 481 and the second plate 483. For weight balance, one of the three guide shafts 488 may be arranged on the center line P in the first direction V1 of the case 200, and the other two guide shaft 488 may be placed at a position symmetrical to both sides with respect to the center line P in the first direction V1 of the case 200.

It is understood that, in another exemplary embodiment, the first plate 481 and the second plate 483 may be formed in a disk shape, and multiple guide shafts 488 may be placed at a predetermined interval along the circumferences of the first and second plate 481 and 483, and the center of gravity may be positioned on the center line Pin the first direction V1 of the case 200.

In this case, the centers of the first plate 481 and the second plate 483 may be positioned on the center line P in the first direction V1 of the case 200, and the guide shaft 488 with corresponding numbers may be arranged on both sides with respect to the center line P in the direction V1.

With the structure as described above, if the regulator valve 320 of the gas tank 300 is inserted into the gas supply unit 430, the pressurizing unit 480 can apply pressure to the gas supply unit 430 in the direction of the regulator valve 320, so the regulator valve 320 and the gas supply unit 430 may be tightly coupled to each other.

This helps prevent leakage of gas by preventing the regulator valve 320 and the gas supply unit 430 from being separated during the gas supply process.

In addition, the gas tank 300 can be fixed to the gas tank mounting and removing part 210 with the fixing member 250. When a user wants to replace the gas tank 300 and releases the fixing member 250, the gas tank 300 can be pushed out from the gas tank mounting and removing part 210 by the repulsive pressing force of the pressurizing elastic body 487. Accordingly, the user can easily and quickly replace the gas tank 300 by simply releasing the fixing member 250.

Referring to FIGS. 22, 25 and 26, the gas supply unit 430 may be connected to the regulator valve 320 of the gas tank 300 to be inserted into the case 200, and be placed on the front portion 201 of the case 200 to supply gas to the stack part 410 placed inside the 200.

The gas supply unit 430 may include a manifold block 450 and a gas supply pipe 440. The manifold block 450 may be connected to the regulator valve 320 of the gas tank 300, and the gas supply pipe 440 may be connected and placed between the manifold block 450 and the stack part 410.

Here, the manifold block 450 may be positioned on the center line P of the case 200 in the first direction V1 for weight balance. That is, the manifold block 450 may have a shape in which both sides are symmetrical with respect to the center line P in the first direction V1.

As discussed above, the gas tank 300 may be placed on the center line P in the first direction V1 of the case 200, and a plurality of stack parts 410 may be placed on a position symmetrical to both sides of the gas tank 300 in the case 200.

In this case, the gas supply pipe 440 may be branched from the manifold block 450 in a number corresponding to the plurality of stack parts 410, and the plurality of gas supply pipes 440 may be placed in the shape or positioned symmetrical to each other on both sides of the case 200 based on the center line P in the first direction V1.

Here, the gas supply pipe 440 may be connected to the upper side of the stack part 410. Thus, gas can be supplied from the upper side to the lower side of the stack part 410 and be diffused downward, so that the electrochemical reaction can be occurred.

Condensed water is generated as a by-product of the electrochemical reaction of oxygen and hydrogen, and the condensed water falls downwards by gravity.

If the gas supply pipe 440 is connected to a middle side or lower side of the stack part 410, the fall of the condensate may interfere with the diffusion of gas.

On the other hand, the regulator valve 320 may be connected to the outlet of the gas tank 300 to depressurize the gas discharged from the gas tank 300 and to supply the same to a manifold flow path 456 of the manifold block 450. Hydrogen gas may be discharged from the gas tank 300.

The regulator valve 320 may include a connector part 325 and an opening and closing part 330.

The connector part 325 may be connected to the outlet of the gas tank 300. The connector part 325 may be connected to the outlet of the gas tank 300 by a bolt/screw fastening structure, but is not limited thereto.

Referring to FIGS. 22, 23, 25 and 26, a depressurizing part 323, a gas charging part 321, a pressure sensor 322, and a temperature-responsive pressure discharging part 324 may be placed in the connector part 325.

The depressurizing part 323 may adjust the degree of decompression of the gas flowing out of the outlet of the gas tank 300.

The gas charging part 321 may be provided in a form of a valve to charge the gas tank 300 with gas. A user can simply charge gas by connecting an external gas supply device and the gas charging part 321 with a hose by opening the lid 204 of the case 200 without separating the gas tank 300.

The pressure sensor 322 may measure an internal gas pressure of the gas tank 300. Depending on the operating environment, the internal gas pressure of the gas tank 300 may be changed, and in some cases, the internal gas pressure of the gas tank 300 may reach a limit value and cause an explosion.

For example, when a drone is operating in a hot area and it is maneuvering while exposed to high temperatures, the internal gas pressure of the gas tank 300 may be raised due to the high temperature. In this case, the pressure sensor 322 may measure the internal gas pressure of the gas tank 300 and transmit the information to a user.

The temperature-responsive pressure discharging part 324 may automatically discharge the internal gas pressure of the gas tank 300 in response to the internal gas temperature of the gas tank 300. This is because the gas is automatically discharged when the internal gas pressure of the gas tank 300 reaches a limit value as the gas tank 300 is exposed to a high temperature environment and the internal gas temperature of the gas tank 300 is raised. Accordingly, the explosion accident of the gas tank 300 can be prevented in advance.

Referring to FIGS. 25 and 26, the opening and closing part 330 may include one end connected to the connector part 325, and the other end inserted into an insertion space 452 of the manifold block to open and close gas flows.

The opening and closing part 330 may include a valve body 334 having an internal flow path 332 and a dispersion flow path 333, a valve elastic body 337, and an opening and closing bar 336.

The valve body 334 may be implemented in a cylindrical shape, and may be inserted into the insertion space 452 formed in the manifold block 450. One side of the valve body 334 may be connected to the connector part 325, and the other side may have a valve protrusion 335 having a central portion protruded toward the manifold block 450.

The valve protrusion 335 may have a cylindrical shape. A diameter of the valve protrusion 335 may be smaller than a diameter of the valve body 334 connected to the connector part 325.

The internal flow path 332 may be connected to the connector part 325 and may be placed in the valve body 334. The internal flow path 332 may be a flow path through which the hydrogen gas reduced by the set pressure of the depressurizing part 323 in the connector part 325 can flow.

The internal flow path 332 may include an opening and closing space 331 extending radially from the other side of the valve body 334.

In addition, the dispersion flow path 333 may be formed inside of the valve protrusion 335 of the valve body 334 in communication with the internal flow path 332.

The dispersion flow path 333 may be formed in a radial direction in the valve protrusion 335 so that gas is dispersed in the radial direction. A plurality of the dispersion flow paths 333 may be formed along the circumferential direction of the valve protrusion 335.

The hydrogen gas discharged from the dispersion flow path 333 can flow into the manifold flow path 456 of the manifold block 450, and be supplied to each stack part 410 through the gas supply pipe 440

The valve elastic body 337 may be placed in the opening and closing space 331. The valve elastic body 337 may be a coil spring or a leaf spring.

The valve elastic body 337 can provide an elastic force to the opening and closing bar 336 so that the opening and closing bar 336 can be pressurized in the direction of a push part 460 of the manifold block 450.

One end 336a of the opening and closing bar 336 may be supported by the valve elastic body 337 and be placed in the opening and closing space 331 of the internal flow path 332.

The other end 336b of the opening and closing bar 336 may be placed in the through hole 335a formed in the valve protrusion 335 and be protruded in the direction of the push part 460 of the manifold block 450.

The manifold block 450 may be connected between the regulator valve 320 and the stack part 410 to introduce the gas discharged through the regulator valve 320 into the stack part 410.

The manifold block 450 may include a body part 451, a link part 455, and a push part 460.

The body part 451 may have an overall cylindrical shape, and an insertion space 452 may be formed in a shape corresponding to the regulator valve 320 at one side thereof.

The insertion space 452 may include a valve protrusion receiving hole 453 which is positioned in the direction of the center line of the insertion space 452 and receives the valve protrusion 335 of the valve body 334.

The valve body 334 and the valve protrusion 335 may be inserted into the insertion space 452 and the valve protrusion receiving hole 453. The insertion space 452 and the valve protrusion receiving hole 453 may be formed in a shape corresponding thereto so that the valve body 334 and the valve protrusion 335 can be received, respectively.

The link part 455 may be placed on the other side of the body part 451. The manifold flow path 456 may be placed on the link part 455 so that gas discharged from the regulator valve 320 inserted into the insertion space 452 flows into the stack part 410.

Here, a plurality of manifold flow paths 456 having a number corresponding to the number of stack parts 410 for supplying hydrogen gas may be formed on the link portion 455.

The push part 460 may be placed to contact the other end 336b of the opening and closing bar 336 in the body part 451 so that the opening and closing bar 336 can be pushed.

The push part 460 may be implemented in a groove shape in which a part of the other end 336b of the opening and closing bar 336 may be received.

It is understood that, in another exemplary embodiment, the push part 460 may be formed in a protrusion shape.

In this case, the other end 336b of the opening and closing bar 336 may be placed in the through hole 335a. When the valve protrusion 335 is completely inserted into the insertion space 452 of the body part 451, the protrusion shape of the push part 460 can be inserted into the through hole 335a and push the other end 336b of the opening and closing bar 336.

Accordingly, one end 336a of the opening and closing bar 336 can be separated from the contact surface of the opening and closing space 331, and the internal flow path 332 and the dispersion flow path 333 can be opened.

It is understood that although the opening and closing part 330, which is a part of the regulator valve 320, may be inserted into the manifold block 450 (e.g., the insertion space 452), this is only an example, and is not limited thereto. For example, the manifold block 450 may be inserted into the regulator valve 320.

Here, a first sealing 471 may be placed on an outer surface of the valve body 334 to prevent the gas leakage between an inner surface of the insertion space 452 and the outer surface of the valve body 334.

In addition, a second sealing 473 may be placed on an outer surface of the valve protrusion 335 to prevent the gas leakage at the insertion and coupling surface between the valve protrusion 335 and the valve protrusion receiving hole 453 of the manifold block 450.

The first and second sealings 471 and 473 may be O-rings, but are not limited thereto. Here, at least one of the first and second sealings 471 and 473 may be formed of a material with elasticity. As an example, the first and second sealings 471 and 473 may be made of a material such as rubber or soft plastic.

In addition, the first sealing 471 may be compressed between the outer circumferential surface of the valve body 334 and the inner circumferential surface of the insertion space 452 of the manifold block 450, so that the valve body 334 and the manifold block 450 may be pressed and bonded.

The second sealing 473 may be compressed between the outer circumferential surface of the valve protrusion 335 of the valve body 334 and the inner circumferential surface of the valve protrusion receiving hole 453 of the manifold block 450, so that the valve protrusion 335 of the valve body 334 and the manifold block 450 may be pressed and bonded.

That is, the valve body 334 and the manifold block 450 can have enhanced sealing force for preventing gas leakage and be coupled to each other with the applied compressive force by the first and second sealings 471 and 473.

Referring to FIG. 27, a flow control valve 490 may be placed in the manifold flow path 456 to control the flow rate of the gas discharged from the regulator valve 320 to the manifold flow path 456.

The flow control valve 490 may be an electronic control valve such as a solenoid valve, and a user can control the flow rate of the gas supplied to the stack part 410 with power control on the manifold flow path 456 by using the flow control valve 490.

For example, a central hole 457 into which the valve protrusion 335 is inserted may be formed in a central portion of the manifold block 450. The gas discharged from the through hole 335a of the valve protrusion 335 can pass through a plurality of dispersion flow path 333 placed along the circumference of the valve protrusion 335 and be introduced into the central hole 457, and the gas introduced into the central hole 457 can pass through the branch hole 458 and be distributed to the manifold flow path 456.

In this case, the flow control valve 490 may include a valve housing 491, a stator 492, a rotor 493, and an opening and closing piece 494. The valve housing 491 may be connected to the lower side of the manifold block 450, the stator 492 may be placed in the valve housing 491, the rotor 493 may be placed at a center of the stator 492, and the opening and closing piece 494 may be mounted to an end of the rotor 493.

Here, the flow control valve 490 may be a normal close type valve that is, in a closed state at all times. In this case, when a user applies power, the valve is opened.

That is, when a user applies power in the state in which the opening and closing piece 494 is inserted into the branch hole 458, the rotor 493 can move in a direction opposite to the branch hole 458 by an electromagnetic reaction. Accordingly, the opening and closing piece 494 mounted to the end of the rotor 493 can be released from the branch hole 458 to control the opening and closing of the branch hole 458.

If a user turns off the power to stop using the fuel cell power pack, the rotor 493 can move to the branch hole 458 again, and the opening and closing piece 494 can be inserted into the branch hole to block the flow of hydrogen gas.

Here, the flow control valve 490 may be configured to be automatically closed when a failure or emergency situation of the fuel cell power pack occurs.

In the exemplary embodiments, the flow control valve 490 may be the electronic control valve, but is not limited thereto.

Here, the flow control valve 490 can be understood as an auxiliary means for controlling the flow of hydrogen gas together with the opening and closing bar 336.

For example, when the opening and closing bar 336 is damaged or worn due to external shock or long-term use, and the opening and closing of the gas is not smooth, the flow control valve 490 can open and close the branch hole 458, so that the opening and closing of gas can be controlled auxiliary.

Because the hydrogen gas is an ignitable material, the primary opening and closing structure by the opening and closing bar 336 and the push part 460 and the secondary opening and closing structure by the flow control valve 490 and the branch hole 458 can provide more stable control of gas supply.

Hereinafter, an opening and closing method according to the gas supply structure according to the exemplary embodiments will be described with reference to FIGS. 25 to 27.

When a user inserts the gas tank 300 into the gas tank mounting and removing part 210 of the case 200, the regulator valve 320 coupled to the gas tank 300 can be inserted into the manifold block 450 of the gas supply unit 430.

For example, when the valve body 334 of the regulator valve 320 is inserted into the insertion space 452 of the manifold block 450, the other end 336b of the opening and closing bar 336 can be placed abutting against the inner end of the push part 460.

As shown in FIG. 26, when an operator pushes the valve body 334 into the insertion space 452, the other end 336b of the opening and closing bar 336 may be pushed by the inner end of the push part 460, and the one end 336a of the opening and closing bar 336 may be released from the contact surface 331a of the opening and closing space 331. Thus, a gas flow path can be opened.

That is, while the one end 336a of the opening and closing bar 336 can move in the direction of the internal flow path 332 within the opening and closing space 331, the internal flow path 332 and the through hole 335a can communicate with each other.

In this case, through the space between the contact surface 331a of the opening and closing space 331 and the one end 336a of the opening and closing bar 336, a gas flow path can be formed. Accordingly, the internal flow path 332, the opening and closing space and the dispersion flow path 333 can be in communication with each other, and the gas of the internal flow path 332 may flow into the dispersion flow path 333.

As the gas flow path is opened, the gas discharged from the gas tank 300 can be first reduced by a predetermined pressure by the depressurizing part 323 of the regulator valve 320 and then flow in the direction of the internal flow path 332.

Because the internal flow path 332 and the dispersion flow path 333 may be in communication with each other by the movement of the opening and closing bar 336, as shown in FIG. 26, gas can be discharged from the internal flow path 334 to the dispersion flow path 333 through the opening and closing space 331, and then flow into the manifold flow path 456.

In addition, gas can be supplied to each of the stack parts 410 by the gas supply pipe 440 connected to the manifold flow path 456.

In this case, the first and second sealings 471 and 473 may be placed between the outer surface of the valve body 334 and the outer surface of the valve protrusion 335, and the inner surface of the insertion space 452 to prevent external leakage of hydrogen gas.

If the gas tank 300 is to be replaced or the gas supply is to be stopped, an operator may remove the valve body 334 of the regulator valve from the insertion space 452 of the manifold block 450.

In this case, a restoring force of the valve elastic body 337 can be generated so that the opening and closing bar 336 can be pushed in the direction of the push part 460, and the one end 336a of the opening and closing bar 336 can be in close contact with the contact surface 331a of the opening and closing space 331.

Accordingly, the connection between the internal flow path 332 and the dispersion flow path 333 can be blocked from each other, and the gas supply to the manifold flow path 456 can be blocked.

Alternatively, a user can cut off the gas supply by turning off the power and closing the branch hole 458 with the flow control valve 490. In this case, the user does not need to remove the gas tank 300 from the case 200.

A two-step gas flow control including the primary opening and closing structure by the opening and closing bar 336 and the push part 460 and the secondary opening and closing structure by the flow control valve 490 and the branch hole 458 can provide a stable gas supply system.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A fuel cell power pack comprising:
a case;
a gas tank placed in a gas tank mounting and removing part formed in the case; and
a fuel cell unit placed in the case in a weight balance with the gas tank,
wherein the gas tank mounting and removing part comprises:
an insertion groove formed on a rear portion of the case to insert the gas tank; and
a fixing member placed on circumference of the insertion groove to fix the gas tank,
wherein the fixing member comprises:
a fixing block fixed to an inner surface of the case and including a moving groove formed therein;
a moving block including a protrusion inserted into the moving groove and connected to the fixing, block;
a fixing bar connected to the moving block by a link bar and mounted on and removed from the insertion groove of the gas tank; and
a coil s ring placed between the inner surface of the fixing block and an inner space of the protrusion.

2. The fuel cell power pack of claim 1, wherein the fuel cell unit comprises:
a manifold part connected to a regulator valve coupled to the gas tank; and
a stack part connected to the manifold part to receive fuel gas.

3. The fuel cell power pack of claim 2, wherein the manifold part and the stack part are arranged in a weight balance with respect to a second direction V2 of the case based on a center line P in a first direction V1 of the case.

4. The fuel cell power pack of claim 3, wherein the manifold part is placed on an inner front portion of the case, and a plurality of the stack parts are placed on positions symmetrical to each other on both inner sides of the case.

5. The fuel cell power pack of claim 2, wherein the gas tank and the stack part are in weight balance with respect to a second direction V2 of the case based on a center line P in a first direction V1 of the case.

6. The fuel cell power pack of claim 5, wherein a plurality of the stack parts are placed in the case.

7. The fuel cell power pack of claim 6, wherein the gas tank and the plurality of the stack parts are in weight balance with respect to the second direction V2 of the case based on the center line P in the first direction V1 of the case.

8. The fuel cell power pack of claim 7, wherein the gas tank is placed on the center line P in the first direction V1 of the case.

9. The fuel cell power pack of claim 8, wherein the plurality of the stack parts are placed on positions symmetrical to each other on both sides of the case based on the gas tank.

10. The fuel cell power pack of claim 2, further comprising an auxiliary power supply part configured to be disposed in the case and to be connected to the fuel cell unit in parallel to supply auxiliary power.

11. The fuel cell power pack of claim 10, wherein a plurality of the auxiliary power supply parts are placed on positions symmetrical to each other based on a center line P in a first direction V1 of the case.

12. The fuel cell power pack of claim 11, wherein a plurality of the stack parts are placed in the case, and
the plurality of the stack parts and the plurality of the auxiliary power supply parts are arranged in a weight balance with respect to a second direction V2 of the case based on the center line P of the first direction V1 of the case.

13. A fuel cell power pack comprising:
a case;
a gas tank placed in a gas tank mounting and removing part formed in the case;
a fuel cell unit placed in the case in a weight balance with the gas tank,
wherein the fuel cell unit comprises:
a manifold part connected to a regulator valve coupled to the gas tank; and
a stack part connected to the manifold part to receive fuel gas, and
a discharge part formed on an inner lower portion of the case to collect and discharge condensed water discharged from the stack part or condensed water generated by condensing external air in the case,
wherein the discharge part comprises:
a drain tank having a recessed shape and formed in the inner lower portion of the case;
a first drain pipe connected to a lower portion of the stack part and configured to be disposed in the drain tank to discharge the condensed water discharged from the stack part to an outside; and
a second drain pipe placed in the drain tank to discharge the condensed water generated by condensing the external air in the case.

14. A fuel cell power pack comprising:
a case;
a gas tank placed in a gas tank mounting and removing part formed in the case;
a fuel cell unit placed in the case in a weight balance with the gas tank,
wherein the fuel cell unit comprises:
a manifold part connected to a regulator valve coupled to the gas tank; and
a stack part connected to the manifold part to receive fuel gas, and
a discharge part formed on an inner lower portion of the case to collect and discharge condensed water discharged from the stack part or condensed water generated by condensing external air in the case,
wherein the discharge part comprises:
a drain tank having a recessed shape and formed in the inner lower portion of the case; and
a drain hole placed in the drain tank and including a gap hole to slowly discharge the condensed water collected in the drain tank.

15. The fuel cell power pack of claim 14, wherein the discharge part further comprises a humidification unit placed in the drain tank to evaporate the condensed water collected in the drain tank to create a humidification environment in the case.

16. The fuel cell power pack of claim 15, wherein the humidification unit is a heat coil, an ultrasonic humidification sensor, or a natural convection humidifier.

17. The fuel cell power pack of claim 1, wherein the fixing member further comprises:
a guide groove formed in the fixing block; and
a guide protrusion placed in the moving block and inserted into the guide groove.

18. The fuel cell power pack of claim 17, wherein the fixing member further comprises:
   a fixing bolt placed in the fixing block; and
   a fixing groove placed in the moving block and into which an end of the fixing bolt is inserted.

* * * * *